US012752345B2

(12) United States Patent
Fellmann et al.

(10) Patent No.: US 12,752,345 B2
(45) Date of Patent: Oct. 6, 2026

(54) POWER TOOL

(71) Applicant: Robert Bosch GmbH, Stuttgart (DE)

(72) Inventors: Willi Fellmann, Solothurn (CH); Bruno Luescher, Vordemwald (CH); Aldo Di Nicolantonio, Rüttenen (CH); Andreas Zurbruegg, Luterbach (CH); Bruno Sinzig, Oberbipp (CH); Laurent Quebatte, Visp (CH); Marcus Schuller, Dettenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 18/618,011

(22) Filed: Mar. 27, 2024

(65) Prior Publication Data

US 2024/0227033 A1 Jul. 11, 2024

Related U.S. Application Data

(63) Continuation of application No. 16/326,746, filed as application No. PCT/EP2017/070312 on Aug. 10, 2017, now Pat. No. 11,980,947.

(30) Foreign Application Priority Data

| | | |
|---|---|---|
| Aug. 22, 2016 | (DE) | 10 2016 215 691.8 |
| Jan. 31, 2017 | (DE) | 10 2017 201 509.8 |
| Aug. 7, 2017 | (DE) | 10 2017 213 668.5 |

(51) Int. Cl.
*B23B 31/10* (2006.01)
*B24B 45/00* (2006.01)
(Continued)

(52) U.S. Cl.
CPC ............ *B23B 31/10* (2013.01); *B24B 45/006* (2013.01); *B27B 5/32* (2013.01); *B24B 23/022* (2013.01); *B24B 23/028* (2013.01)

(58) Field of Classification Search
CPC ..... B23B 31/10; B24B 45/006; B24B 23/022; B24B 23/028; B27B 5/32
See application file for complete search history.

(56) References Cited

U.S. PATENT DOCUMENTS

| | | |
|---|---|---|
| 2,062,969 A | 12/1936 | Dutcher |
| 6,523,214 B1 | 2/2003 | Kaiser |

(Continued)

FOREIGN PATENT DOCUMENTS

| | | |
|---|---|---|
| CN | 1706596 A | 12/2005 |
| CN | 101043987 A | 9/2007 |

(Continued)

OTHER PUBLICATIONS

International Search Report corresponding to PCT Application No. PCT/EP2017/070312, mailed Oct. 19, 2017 (German and English language document) (6 pages).

*Primary Examiner* — Sunil K Singh
*Assistant Examiner* — Eric Daniel Whitmire
(74) *Attorney, Agent, or Firm* — Maginot, Moore & Beck LLP

(57) ABSTRACT

A power tool, in particular a hand-held power tool, includes a tool-holding device that rotates about an output axis. The tool-holding device is configured to hold a tool device on the power tool such that the output axis and a tool rotation axis substantially coincide. The tool-holding device has at least a driver device and a clamping device that is movable relative to the driver device. To transfer a driving force to the tool device, the driver device has at least one torque transfer region that is arranged at a distance from the output axis. The driver device and the clamping device are configured to reach through a cut-out of the tool device, which cut-out extends through the entire material thickness of the tool device, and to clamp the tool device via the clamping device,
(Continued)

which is movable substantially in a direction radial to the output axis.

20 Claims, 18 Drawing Sheets

(51) Int. Cl.
*B27B 5/32* (2006.01)
*B24B 23/02* (2006.01)

(56) References Cited

U.S. PATENT DOCUMENTS

| | | | |
|---|---|---|---|
| 7,077,735 B2 | 7/2006 | Krondorfer et al. | |
| 2005/0085174 A1 | 4/2005 | Yanase | |
| 2007/0018413 A1 | 1/2007 | Allemann et al. | |
| 2014/0017000 A1* | 1/2014 | Kaye, Jr. ................. | B23B 31/19 403/373 |
| 2014/0182873 A1 | 7/2014 | Fankhauser et al. | |
| 2015/0035239 A1 | 2/2015 | Maissen | |
| 2015/0108725 A1 | 4/2015 | Luescher et al. | |
| 2016/0184956 A1 | 6/2016 | Klabunde et al. | |
| 2019/0202027 A1 | 7/2019 | Fellmann et al. | |

FOREIGN PATENT DOCUMENTS

| | | | |
|---|---|---|---|
| CN | 102441832 | A | 5/2012 |
| CN | 104159711 | A | 11/2014 |
| CN | 105473282 | A | 4/2016 |
| DE | 37 40 200 | A1 | 6/1989 |
| DE | 196 16 764 | A1 | 11/1997 |
| DE | 10 2010 042 016 | A1 | 4/2012 |
| DE | 10 2011 075 228 | A1 | 11/2012 |
| DE | 10 2012 004 458 | A1 | 9/2013 |
| DE | 10 2012 007 926 | A1 | 10/2013 |
| DE | 20 2013 006 901 | U1 | 12/2014 |
| DE | 10 2014 210 915 | A1 | 12/2015 |
| EP | 0 904 896 | A2 | 3/1999 |
| RU | 2 516 443 | C2 | 5/2014 |
| RU | 2 590 426 | C2 | 7/2016 |
| WO | 2013/131676 | A2 | 9/2013 |
| WO | 2015/014468 | A1 | 2/2015 |
| WO | 2015/014469 | A1 | 2/2015 |
| WO | 2018/036831 | A1 | 3/2018 |

* cited by examiner

POWER TOOL

This application is a continuation application of copending U.S. patent application Ser. No. 16/326,746, filed on Feb. 20, 2019, which is a 35 U.S.C. § 371 National Stage Application of PCT/EP2017/070312 filed on Aug. 10, 2017, which claims the benefit of priority to Serial Nos. DE 10 2016 215 691.8 filed on Aug. 22, 2016 in Germany, DE 10 2017 201 509.8 filed on Jan. 31, 2017 in Germany, and DE 10 2017 213 668.5 filed on Aug. 7, 2017 in Germany, the disclosures of all of which are incorporated herein by reference in their entirety.

The disclosure relates to a power tool, in particular a manually guided power tool, preferably an angle grinder, which has a tool receiving device that can be moved in rotation about an output axis, wherein this tool receiving device is designed to hold a tool device, in particular an insert tool, on the power tool in such a manner that the output axis and a tool rotation axis substantially coincide, wherein the tool receiving device has at least one driving device and a clamping device that can be moved relative to the driving device, wherein, for the purpose of transmitting a driving force to the tool receiving device, the driving device has at least one torque transmission region, arranged at a distance from said output axis.

BACKGROUND

DE 10 2012 007 926 A1 discloses a hand-held power tool, comprising a housing, which comprises a spindle head, having a tool spindle that can be driven about its longitudinal axis and having a chucking device, which has a fastening element. The tool spindle has a tool-side end having a holding portion for a tool to be driven. The chucking device has a chucking configuration, in which the tool can be fixed on the tool spindle by means of the fastening element, and has a release configuration, in which the tool can be released. The chucking device is realized such that, by means of a same-direction adjustment movement, it can be switched over between the chucking configuration and the release configuration.

DISCLOSURE OF THE DISCLOSURE

The disclosure is based on the object of improving a hand-held power tool by simple design measures.

The object is achieved with a power tool, in particular a manually guided power tool, preferably an angle grinder, which has a tool receiving device that can be moved in rotation about an output axis, wherein this tool receiving device is configured to hold a tool device, in particular an insert tool, on the power tool in such a manner that the output axis and a tool rotation axis substantially coincide, wherein the tool receiving device has at least one driving device and a clamping device that can be moved relative to the driving device, wherein, for the purpose of transmitting a driving force to the tool device, this driving device has at least one torque transmission region, arranged at a distance from this output axis.

According to the disclosure, the driving device and the clamping device are designed to reach through a cutout of the tool receiving device, which in particular extends through the entire material thickness of the tool device, and to clamp the tool device by means of the clamping device, which is movable substantially in the radial direction in relation to the output axis.

The disclosure is described in the following primarily using the example of a, in particular, manually guided power tool, which has a tool receiving device that can be moved in rotation about an output axis. However, this limitation of the presentation is not to be understood as a limitation of the application possibilities of such a power tool. For simplification, instead of the term “tool receiving device”, the term “tool receiver” is also used in the following. This, however, is not to be understood as a limitation.

A power tool is an appliance that has one or more drive motors, and possibly one or more transmission devices, and at least one output shaft having—to be understood in the geometric sense—an output axis. The tool receiving device is arranged indirectly or directly on the output shaft. The tool receiving device is the structural part, or structural parts, by which the torque is applied to the tool device, the tool receiving device preferably also holding the tool device, in particular in the case of a manually guided power tool, such that the tool device is both held by the tool receiving device and has the output torque of the latter applied to it. The term output torque, and the terms formed with output, mean the moment transmitted from the power tool to the tool device, or the corresponding structural parts of the power tool, the term driving torque denoting the torque taken up by the tool device. The tool device may be realized as an insert tool for performing grinding, parting-off or other work on a workpiece that is to be worked.

A manually guided power tool has a carrying means, in particular handles and the like, by which the power tool, with the tool fastened thereto, can be guided and/or held by an operator. Typically, manually guided power tools are provided with an electric drive motor, but other designs such as, for example, power tools operated by means of an internal combustion engine, or operated hydraulically or pneumatically, are also known, and may be used within the scope of the disclosure.

Suitable as a power tool is both a stationary power tool such as, for example, a bench circular saw, according to the applications DE 102010042016 or U.S. Pat. No. 2,062,969 A, and a non-stationary power tool such as, for example, a hand-held circular saw according to the application DE 3740200 A1 or such as, for example, an angle grinder according to the application DE102014210915 A1 or such as, for example, a knapsack-type brushcutter according to the application DE 19616764 A1. Alternatively, a manually guided power saw is also suitable. The non-stationary power tool may be manually guided or hand-held. The power tool according to the disclosure is preferably realized as an angle grinder.

The power tool according to the disclosure makes it possible for tool devices, in particular for high-speed applications, to be received, or chucked, without the use of a tool, such that preferably there is no need for an additional, in particular, removable, securing element such as, for example, a fastening screw, for fastening the tool device to the tool receiving device of the power tool. The power tool is thus designed to connect, or chuck, a tool device to the tool receiving device in a particularly rapid and convenient manner such that, in the case of such a power tool, an operator can effect a particularly rapid tool change. Also, as a result, the use of an additional tool such as, for example, a wrench or a screwdriver, is no longer required to connect the tool device to, or release it from, the power tool.

In particular, as the rotational speed of the tool receiving device increases, the clamping device can exert upon the tool device a clamping force that is increased by a centrifugal force acting upon the clamping device, as a result of which the clamping force acting upon the tool device increases as the rotational speed increases. This can be seen particularly in the case of power tools that can be driven in rotation at high speed.

The term “movable” is to be understood to mean, in particular, movably supported and/or, preferably, movably supported so as to be pivotable about a rotation axis.

The tool receiving device may be fixedly connected to the power tool. However, the tool receiving device may also be releasably fastened to an output shaft, output spindle or the like.

In particular, the clamping device may have at least one, in particular at least two, hook device(s). Preferably, a hook device is to be understood to mean a rotatable, pivotable or displaceable device that has at least one active area for transmitting a clamping force action to the tool device.

If the clamping device is realized with at least two hook devices, the latter may be realized such that they can be moved relatively, in particular can be pivoted about a pivot axis, such that they are realized so as to be movable in a direction radial to the output axis. The hook devices preferably have a common axis of motion, in particular a common pivot axis. It is also conceivable, however, for the hook devices to have differing axes of motion, in particular pivot axes running at least substantially parallel to each other. The axis of motion, in particular the pivot axis, of the clamping device, in particular of the hook devices, preferably runs in a plane running transversely, in particular at least substantially perpendicularly, in relation to the output axis. The axis of motion, in particular the pivot axis, of the clamping device preferably forms a clamping device rotation axis.

The at least two hook devices may be realized such that they can be moved relative to each other, in particular about the pivot axis, in an angular range of up to 50°, preferably up to 40°, preferably up to 30°, particularly preferably up to 20°.

The clamping device, or the at least two hook devices, may be in at least two states, namely, in a fastening state or in a release state.

In a fastening state, the hook devices are extended oriented away in a radial direction from the output axis, in particular such that the hook devices assume a maximal radial extent in relation to each other in an extended state. In a fastening state, the clamping device may be designed to hold the tool device in a positive and/or non-positive manner in a direction radial to the output axis. In a fastening state, the hook devices are preferably connected to, in particular in engagement with, the tool device, in particular as a result of a movement of the hook devices in a direction radial to the output axis, or around the axis of motion of the clamping device. The tool device in this case can be held, by means of the hook devices, such that it can be received in a positive and/or non-positive manner on the power tool. In a fastening state, the tool device is connected to the tool receiving device in a positive manner in a radial direction of the output axis. In a fastening state, the driving device may project in the axial direction of the output axis relative to the clamping device, in particular the hook devices. In a fastening state, the driving device may delimit an axial extent of the tool receiving device.

In a release state, the clamping device, in particular the at least two hook devices, is retracted in a direction radial to the output axis, in particular such that the clamping device, in particular the at least two hook devices has, at least in sections, a maximal radial extent, along a direction running at least substantially perpendicularly in relation to the output axis, that is less than a minimal radial extent of the cutout of the tool device. In a release state, the clamping device, in particular the hook devices, may project in the axial direction of the output axis relative to the driving device. In a release state, the clamping device, in particular the hook devices, may delimit an axial extent of the tool receiving device.

Preferably, the maximal radial extent of the clamping device, in particular of the at least two hook devices, which, when the clamping device is in a release state, is less than a minimal radial extent of the cutout of the tool device, is arranged, in an axial portion of the clamping device, in a region of the tool receiving device that projects, or protrudes freely, in the axial direction of the output axis, and is configured to be realized such that it can be surrounded by the cutout of the tool device. Preferably, the axial portion in which the maximal radial extent of the clamping device is arranged is not formed by an axial portion of the clamping device that does not project in the axial direction of the output axis, or that is not surrounded, or that cannot be surrounded, by the tool device or the power tool in a plane around 360°. The clamping device, in particular the at least two hook devices, may be understood as “projecting” if the clamping device projects, or protrudes, with respect to a placement region, for axially placing the tool device, that in a fastening state and/or a release state delimits a movement of the tool device in the axial direction of the output axis. The axial portion may be regarded as an axial offset of the clamping device that, in the release state, projects with respect to the driving device.

When the clamping device is in a release state, the tool device can be placed onto the tool receiving device in at least one or at least two steps.

The tool receiving device may have a first attachment region and a second attachment region. The first attachment region may delimit an axial extent of the driving device. The first attachment region may delimit an axial extent of the tool receiving device in a fastening state. The second attachment region may surround the first attachment region, in particular in a plane of 360°. The attachment regions extend, at least substantially, in a direction radial to the output axis and in the circumferential direction a round the output axis. The first attachment region and the second attachment region may have, respectively, a first and a second, in particular flat, attachment surface. The first attachment surface is arranged at a distance apart from the second attachment surface in the axial direction of the output axis, and in particular parallel thereto. The attachment surfaces delimit the at least one torque transmission region. The attachment surfaces are oriented away from the tool receiving device.

In the case of an operation of placing the tool device in a single step, a cutout of a connection device of the tool device may have a delimiting contour that delimits the cutout and that is in alignment with an outer contour of the clamping device and the driving device, such that placing of the tool device, in the axial direction of the output axis, can be effected in one step, in particular a single step. The tool device in this case may be supported on the clamping device, in particular the hook device. By application of an actuating force to the tool device, in the axial direction of the output axis, the tool device can to move the clamping device, in particular the hook devices, from a release state into an actuation state. This enables the tool device to be received by the tool receiving device. In a fastening state, the tool device may be supported on the second attachment region. In a fastening state, the tool device is supported, in the axial direction of the output axis, on the tool receiving device, in particular the driving device, in particular on the second support surface of the tool receiving device.

In the case of an operation of placing the tool device in at least two steps, in a first placement step a cutout of a connection device of the tool device may have a delimiting contour that delimits the cutout and that, in the case of a first placement of the tool device on the tool receiving device, is oriented, in particular rotated, about the output axis in such a manner that the delimiting contour is not in flush alignment with an outer contour of the clamping device and the driving device. The tool device in this case is supported, in the axial direction of the output axis, on the driving device, and is pre-centered, or roughly centered, by the clamping device in a radial direction. The tool device in this case may be supported on the first attachment region. The connection device is designed preferably to be rotatable about the output axis, in particular up to a positive engagement of the torque transmission region.

The tool device may in particular be rotated about the output axis in such a manner until the delimiting contour of the cutout is in flush alignment with the outer contour of the clamping device and the driving device.

Preferably, in a second placement step that follows the first placement step, the tool device may be guided along the driving device, in the axial direction of the output axis, in such a manner that the cutout of the tool device at least partly, in particular completely, encompasses the clamping device and the driving device. This enables the tool device to be finely centered, as a result of which the tool device can be arranged, with respect to the tool receiving device, in particular the driving device and/or the clamping device, on the tool receiving device so as to be non-rotatable about the output axis. The tool device may be supported on the clamping device. Corresponding to the first placement step, an axial actuating force may then be applied to the tool device, in order to move the clamping device, in particular the hook device, from a release state into an actuation state. The tool device in this case may be supported on the second attachment region and, in particular, form a fastening state.

The tool device is preferably placed on the, in particular first and/or second, placement region, in a position provided for clamping by means of the clamping device.

The term "output axis" and "tool rotation axis" preferably denotes a notional geometrical rotation axis of the tool receiving device and/or of an output shaft of the power tool, or a notional rotation axis of the tool device when having been arranged, in particular fixed, on the tool receiving device.

The torque transmission region of the driving device has at least one output surface, arranged at a distance from the output axis, which in each case has a multiplicity of surface points. The term "output surface" denotes a surface that, at least when the tool device is in a fastening state, is at least partly indirectly or directly in contact with the tool device, in order to transmit the output torque to the tool device. The term "surface point" defines, in particular, points on the upper side of this output surface, and is to be understood geometrically.

The torque transmission region is designed to transmit the driving torque of the power tool to the tool device when the tool device has been arranged, in particular fixed, on the clamping device. Conversely, the torque transmission region may also be designed to transmit a torque, in particular a braking moment produced during braking of the tool motion, from the tool device to the power tool.

It may be expedient for the tool receiving device to have an axial opening that is designed to receive the clamping device. The opening may surround the output axis and/or the clamping device in a plane, in particular a radial plane, around 360°. A radial plane is to be understood to mean a plane that extends radially in relation to the output axis. Preferably, the tool receiving device is arranged at least partly on an output shaft of the power tool, in particular arranged at least partly in an inner region of an output shaft of the power tool that is realized as a hollow shaft. The opening may be realized as a cutout in the housing of the power tool. The clamping device may project in the axial direction relative to the opening. The opening may be delimited, at least in sections, by the second attachment region. The opening may receive, or support, the clamping device such that it is non-rotatable about the output axis. The opening may be elongate in a radial plane. This enables the tool receiving device to be of a particularly compact design.

Further, it may be expedient for the driving device to be realized by at least one driving jaw, in particular serving as a guide jaw. In particular, the driving device may delimit the opening, at least in sections, in the radial direction of the output axis and/or be arranged at least partly in the opening. Preferably, the driving device may be designed to guide the clamping device of the tool receiving device, in particular in the case of a movement, starting from a release state, into a fastening state, or vice versa, in particular in the case of an at least partial movement, in the radial direction. A movement is to be understood to mean, in particular, a relative movement. The opening may be substantially rectangular. Preferably, the at least one driving jaw, serving as a guide jaw, may delimit the opening along a main extent of the rectangular opening, in the radial direction. The opening may surround the output axis is a plane around 360°. Preferably, the opening is arranged, along a direction running transversely, in particular at least substantially perpendicularly, in relation to the output axis, between at least two driving jaws of the driving device. Preferably, the driving jaws delimit the opening at least along the direction running transversely, in particular at least substantially perpendicularly, in relation to the output axis. Preferably, the clamping device is arranged, at least partly, along the direction running transversely, in particular at least substantially perpendicularly, in relation to the output axis, between the at least two driving jaws of the driving device.

As a result, the driving device can assume an additional function, of guiding the clamping device, such that a compact embodiment of the tool receiving device is achieved.

"Oriented toward/away from" is to be understood in this context to mean an orientation, or alignment, in a space such as, for example, in a three-dimensional coordinate system, of a normal that describes a vector that stands perpendicularly on a plane tangential to a reference point or a reference surface or a reference device.

Further, it may be expedient for the driving device to have at least two driving jaws that are arranged parallel to and at a distance from each other. Preferably, the driving jaws can be driven in rotation about the output axis, in particular together with the output shaft.

Preferably, the two driving jaws may be arranged in a uniformly distributed manner, in particular symmetrically, such as, for example, rotationally symmetrically, around the output axis. Preferably, the driving jaws are realized, relative to each other, in a point-symmetrical manner in relation to a point located on the output axis. Acting forces can thereby be better distributed. It is also conceivable, however, for the driving jaws to be realized non-symmetrically in relation to at least one point located on the output axis, for the driving jaws to be realized in mirror-symmetry in relation to at least one plane that comprises the output axis, or the like.

It may be expedient for the clamping device to have at least one clamping surface for transmitting an axial action of force to the tool device. Preferably, the clamping surface is designed, when the clamping device is in a fastening state, to fix the tool device at least axially on the tool receiving device, in particular as a result of a positive and/or non-positive connection. Preferably, the clamping surface is designed, when the clamping device is in a fastening state, to exert upon the tool device a fixing force acting along a direction that runs at least substantially parallel to the output axis. The clamping surface may be flat. The clamping surface may be curved, at least in sections.

It is further proposed that the tool receiving device have a flat seating surface, in particular extending orthogonally in relation to the output axis, that is designed to support the tool device in the axial direction. Preferably, at least when the tool device has been arranged on the tool receiving device, the tool device bears, with at least one contact surface of the tool device, against the seating surface. In a fastening state, the tool device may bear against the seating surface. Preferably, in particular when the clamping device is in a fastening state, the tool device can be pressed onto the seating surface by means of the clamping device. Further, it may be expedient for the tool receiving device to comprise the flat seating surface that is arranged at a distance from the clamping device, in particular from the clamping surface of the clamping device, in the radial direction of the output axis. In particular, the seating surface may extend substantially orthogonally in relation to the output axis. The seating surface may form the second attachment surface of the second attachment region. It is thereby possible to achieve a flat seating of the tool device on and/or at the tool receiving device, as a result of which the tool receiver can accordingly be operated in a reliable manner, while maintaining a required plan tolerance of the tool device with the power tool. It is thereby possible to achieve particularly high angular accuracies of the tool device with respect to the tool receiving device, and thus to reduce vibrations and undue wobbling of the tool device when the tool device is operated with the power tool.

The seating surface may delimit, at least in sections, the opening of the tool receiving device in the radial direction of the output axis. Preferably, at least one scaling element of the tool receiving device is arranged at the opening. The sealing element is preferably designed to bear in a sealing manner against an inner wall, delimiting the opening, of the output shaft realized as a hollow shaft, and in a sealing manner against the driving device and/or the clamping device. Preferably, the sealing element is designed to avoid, at least to a large extent, the ingress of dirt into the tool receiving device, in particular into the output shaft realized as a hollow shaft, through the opening. Preferably, the sealing element surrounds the tool receiving device, in particular the driving device and/or the clamping device, at least partly, in particular completely, along a circumferential direction. The circumferential direction preferably runs in a plane extending at least substantially perpendicularly in relation to the output axis.

Furthermore, it may be expedient for the driving device to have a maximal radial extent, along a direction running transversely, in particular at least substantially perpendicularly, in relation to the output axis, that is greater than a maximal radial extent of the clamping device along a direction running transversely, in particular at least substantially perpendicularly, in relation to the output axis, when the clamping device is in the fastening state. The maximal radial extent of the driving device is preferably realized as a diameter. The maximal radial extent of the driving device preferably has a value of, in particular, less than 35 mm, preferably of less than 30 mm, and particularly preferably of approximately, in particular apart from a production tolerance, exactly, 29 mm. The maximal radial extent of the clamping device in a fastening state preferably extends along a direction running transversely, in particular at least substantially perpendicularly, in relation to the output axis, and has a value of, in particular, less than 34 mm, preferably of less than 29 mm, and particularly preferably of exactly, in particular apart from a production tolerance, 28.5 mm. Preferably, when the clamping device is in a fastening state, the maximal radial extent of the clamping device is located within a maximal diameter of a circle of 28.5 mm around the output axis, or preferably has a value of 28.5 mm. In particular, the clamping device may have a circumferential surface that delimits the clamping device, in particular the at least one hook device, at least in sections, in the radial direction of the output axis. In a release state, the circumferential surface of the clamping device may project with respect to the driving device in the axial direction in relation to the output axis. In a release state, the circumferential surface of the clamping device may be angled with respect to the output axis in such a manner that a distance of the circumferential surface with respect to the output axis decreases, or tapers, in an axial direction of the output axis away from the tool receiving device, or the power tool. The tool device, in an operation of being placed onto the tool receiving device, can thereby be pre-centered, in order to place the tool device onto the power tool in a particularly advantageous manner. In a release state, the circumferential surface of the clamping device may form an angle, with respect to the output axis, that is greater than 5°, in particular greater than 10°, preferably greater than 15°, more preferably greater than 20°, particularly greater than 25°, and/or less than 60°, in particular less than 50°, preferably less than 40°, more preferably less than 35°, particularly preferably less than 30°. In a fastening state, the circumferential surface of the clamping device may be arranged so as to be parallel with respect to the output axis. In particular, the maximal radial extent of the driving device may be greater than a maximal radial extent of the clamping device in relation to the output axis. Preferably, the maximal radial extent of the driving device is delimited, in the radial extent of the output axis, by a driving delimiting circle. Preferably, the maximal radial extent of the clamping device is delimited, in the radial direction of the output axis, by a clamping delimiting circle. The driving delimiting circle preferably has a maximal diameter that is greater, in particular by up to 5%, preferably by up to 3%, more preferably by up to 1%, than a maximal diameter of the clamping delimiting circle. These circles in this case are realized concentrically, in particular around the output axis, in at least one state. When the power tool is operated with the tool device, the clamping device can thereby be protected against damage in a particularly advantageous manner, for example in the case of the tool receiving device colliding with a workpiece on which work is to be performed.

The tool device is preferably centered over the maximal diameter of the driving device, of 29 mm, in that the cutout of the tool device preferably corresponds, at least in sections, approximately, in particular exactly, apart from a production tolerance, to a maximal diameter of 29 mm, such that an exact tolerance is achieved and a good concentricity is ensured.

Furthermore, it may be expedient, when the tool receiving device is in a release state, for the clamping device to project with respect to the driving device, in the axial direction of the output axis, in a direction oriented away from the power tool. In particular, when the tool receiving device, in particular the clamping device, is in a release state, the clamping device may project farther with respect to the driving device, in the axial direction of the output axis, in a direction oriented away from the power tool than when the tool receiving device, in particular the clamping device, is in a fastening state. Preferably, when the tool receiving device, in particular the clamping device, is in a release state, the tool receiving device, in particular the clamping device, may be realized, at least substantially, in a conical shape, or be arranged within a conically shaped envelope that at least partly surrounds or delimits the clamping device, in particular such that the tool device, in a placement operation, is first roughly centered by means of the clamping device and then finely centered by means of the driving device, in the radial direction. A maximal radial extent of the clamping device, in a release state, in particular as viewed along the axial direction, may correspond, at least in section, to a value of 22 mm, in particular to a diameter of a circle of 22 mm running around the output axis, such that the insert tool can be pre-centered. In a placement operation, in the axial direction of the output axis, the tool device can thereby be placed on the driving device of the tool receiving device, and can be pre-centered, or roughly centered, in the radial direction by the clamping device projecting in the axial direction of the output axis. Centering is to be understood to mean, in particular, centering in the circumferential direction, around the output axis.

Further, it may be expedient for the torque transmission region of the driving device to have an, in particular rectilinear or curved, output edge and/or an, in particular flat or curved, output surface. The output surface and/or the output edge can thereby contact a torque take-up region of the tool device in a particularly advantageous manner, in particular in the form of a punctiform contact, preferably in the form of a linear contact, more preferably in the form of an area contact. The output surface may be oriented, in particular aligned around the output axis, in the circumferential direction.

Further, it may be expedient for the at least one torque transmission region, in particular the output surface and/or the output edge, to be angled contrary to a direction of rotation of the tool receiving device when the power tool is in operation. Preferably, the output surface and/or the output edge, in particular in a plane running at least substantially perpendicularly in relation to the output axis, encloses an angle of, in particular, less than 80°, preferably less than 60°, and particularly preferably less than 45°, with a straight line that intersect the output axis and the output surface and/or the output edge, at least in one point, in particular with the radial direction. Damage caused by collisions with workpieces can thereby be avoided.

Further, it may be expedient for the driving device to have at least two torque transmission regions, each having an output edge and/or an output surface, which are oriented away from each other, in particular in relation to a plane that comprises the output axis, and which are substantially parallel to each other. Preferably, the torque transmission regions, each having an output edge and/or an output surface, are arranged at a distance apart relative to each other along a circumferential direction running around the output axis, wherein, in particular, a minimal distance between the torque transmission regions, in particular between the output edges and/or the output surfaces of the torque transmission regions, along the circumferential region is, in particular, greater than 10%, preferably greater than 20%, and particularly preferably less than 60% of a total circumference of the clamping delimiting circle.

It is further proposed that the output edge and/or the output surface are/is angled with respect to a plane spanned by an axial direction and a radial direction of the output axis, in the circumferential direction around the output axis and/or around a radial direction of the output axis that forms a radial axis, in particular is angled by up to 50°, preferably by up to 40°, more preferably by up to 30°, particularly preferably by up to 25°. Preferably, the output edge and/or the output surface enclose an angle which, in particular, is less than 50°, preferably less than 40°, more preferably less than 30°, and particularly preferably greater than 15°, with a plane spanned by the output axis and a direction running transversely, in particular at least substantially perpendicularly, in relation to the output axis. In the case of an angled arrangement of the output surface and/or of the output edge relative to the plane spanned by the output axis and the direction running transversely, in particular at least substantially perpendicularly, in relation to the output axis, a maximal extent of the output surface and/or of the output edge can be minimized, along a direction running at least substantially perpendicularly in relation to the output axis, without reducing a maximal transverse extent of the output surface itself, such that an extent of the driving device can be made particularly compact. In the case of the output surface being angled around the circumferential direction of the output axis, a radial extent of the output surface and/or of the output edge can be minimized, without reducing an extent of the output surface, such that an extent of the driving device can be made particularly compact. In the case of the output surface being angled around a radial direction of the output axis that forms a radial axis, the tool device can be placed onto the tool receiving device in a particularly simple manner in the axial direction, such that a maximal extent of the output surface increases toward the power tool, in the axial direction of the output axis.

The output surfaces may be angled contrary to a direction of rotation of the tool receiving device when the power tool is in operation. Preferably, the output surfaces are inclined relative to a circumferential direction running around the output axis. In particular, the output surfaces each enclose an angle other than 90° with the circumferential direction.

It may be expedient for the tool receiving device, in particular the clamping device, to have an actuation device that is designed, upon an axial actuation of the actuation device by means of an actuating force, to bring the clamping device from a release state, in which the tool device can be removed from the tool receiving device, into a fastening state, in which the tool device is fastened to the tool receiving device.

The actuation device may be actuated by means of the tool device, in that an actuating force is applied to the tool device in such a manner that the tool device exerts an actuating force upon the clamping device, in the axial direction of the tool axis, or output axis, in order to shift the clamping device from a release state into a fastening state.

Preferably, the clamping device may have a clamping cutout.

Further, it may be expedient for the clamping device to have at least one hook device, having at least one radial clamping cutout, which is designed to clamp the tool device in a fastening state, at least in the axial direction of the output axis, and to release it in a release state. The clamping cutout may be designed to receive the tool device, at least partly. The clamping cutout may be designed to receive the tool device at least partly, in a release state. The clamping cutout may be designed to receive the tool device in a fastening state, and to hold it on the tool receiving device. In a release state, the clamping cutout may project, or protrude, in an axial direction along the output axis, at least partly, with respect to the driving device. In a release state, the clamping cutout may project with respect to the driving device in such a manner that the connection device of the tool device is received by the clamping cutout. In a release state, the clamping cutout may be angled with respect to the output axis in such a manner that the connection device of the tool device can be received, at least partly, in the clamping cutout, in particular in the radial direction in relation to the output axis. The clamping cutout may be realized as a circumferential cutout. The clamping cutout may be realized in such a manner that, in a release state, the clamping cutout opens, at least partly, in the axial direction of the output axis in order to receive the tool device, in particular the connection device of the tool device.

In particular, the clamping device may have at least two hook devices, each having at least one radial clamping cutout. In the fastening state, the clamping cutout may extend substantially in the radial direction of the output axis. Preferably, at least when the tool device has been fastened to the tool receiving device by means of the clamping device, the tool device engages, at least partly, in the clamping cutout. A positive connection of the tool device to the power tool, in a fastening state, can thereby be provided in a particularly simple manner. In particular, the clamping device may have at least one clamping surface for transmitting an axial action of force to the tool device, in particular to the connection device of the tool device, in the fastening state. Preferably, the clamping surface contacts the tool device, at least in section, in the form of a punctiform contact, preferably in the form of a linear contact, and particularly preferably in the form of a surface contact. The clamping surface in this case may be flat or, in particular at least in portions, bent.

The contact region forming the punctiform, linear or surface contact depends on the shape and type of the torque transmission regions/torque take-up regions and their combined action. In the case of a punctiform contact region, this contact region has a circular or ellipsoidal extent. A punctiform contact region is particularly insensitive with respect to an imprecise positioning of the tool device with respect to the power tool, such that can be caused by tolerances in the production of the tool device.

In the case of a linear contact region, this contact region has a large extent along the contact line, and a small extent transverse to this line. In comparison with a punctiform contact region, a linear contact region has a greater contact region, and greater driving forces can be transmitted from the power tool to the tool device. In comparison with a linear contact region, a surface contact region offers a greater contact region, in particular a greater contact surface area, and therefore greater driving forces can be transmitted from the power tool to the tool device. In comparison with a punctiform contact, a linear and a surface contact require a greater accuracy, both in the production of the torque transmission regions/torque take-up regions and in the positioning of the tool device on the power tool. The torque transmission regions/torque take-up regions may be matched to each other such that a surface contact or linear contact occurs only upon the transmission of appreciable driving forces, for example when the power tool is operated at nominal power.

The clamping surface may be flat or curved. The clamping surface may be realized in a substantially radial clamping cutout. The clamping cutout may be realized, in particular, as a clamping hollow or as a clamping depression. The clamping surface extends substantially in the radial direction of the output axis. The clamping surface may be oriented toward the power tool. When the tool receiving device is in a fastening state, the clamping surface may be oriented transversely, in particular at least substantially perpendicularly, in relation to the output axis.

Furthermore, it may be expedient for the clamping device, in particular at least a hook device of the clamping device, to be supported so as to be pivotable about clamping-device rotation axis, in particular arranged substantially orthogonally with respect to the output axis, in such a manner that tool devices of differing thickness of the connection devices can be clamped-in by means of the clamping device, in dependence on a pivot angle of the clamping device, in particular of a clamping surface of the clamping device, that is angled with respect to the output axis. As a result, tool devices having connection devices whose thickness, or material thickness, in the axial direction can be configured differently according to the field of application and requirement for the tool device can also be received.

Furthermore, it is proposed that the driving device comprise at least one mounting coding element, which is designed to act in combination with a tool mounting coding element of the tool device when the tool device has been arranged on the tool receiving device. Preferably, the at least one mounting coding element of the driving device is designed to code an arrangement or a placement of the tool device at or on the tool receiving device, in particular the seating surface. Preferably, the at least one mounting coding element of the driving device is designed to code an arrangement or a placement of the tool device at or on the tool receiving device, in particular the seating surface, according to a key-and-keyhole principle. Preferably, the at least one mounting coding element of the driving device is realized as a single piece with the driving device, in particular a driving jaw of the driving device. It is also conceivable, however, for the at least one mounting coding element of the driving device to be realized separately from the driving device, in particular from the driving jaw, and to be fixed to the driving device, in particular the driving jaw, by means of a connection considered appropriate by persons skilled in the art. Preferably, the mounting coding element is realized as a mechanical mounting coding element, such as, for example, as a cutout, an extension, as a groove, as a web, or the like. It is also conceivable, however, for the mounting coding element to be realized as an electronic mounting coding element, such as, for example, as an RFID chip, as an NFC chip, as a radio-wave evaluation device, as an electronic read device (bar-code reader, data matrix code reader, etc.), or the like, or for the mounting coding element to be realized as a combination of a mechanical and an electronic mounting coding element. The tool mounting coding element of the tool device is preferably realized so as to correspond to the mounting coding element of the driving device. In the case of the mounting coding element being designed as a mechanical mounting coding element, the tool mounting coding element is likewise realized as a mechanical tool mounting coding element, such as, for example, as a cutout, an extension, as a groove, as a web, or the like. In the case of the mounting coding element being designed as an electronic mounting coding element, the tool mounting coding element is likewise realized as an electronic tool mounting coding element, such as, for example, as an RFID chip, as an NFC chip, as a radio-wave evaluation device, as an electronic read device (bar-code reader, data matrix code reader, etc.), or the like. Further corresponding designs of the mounting coding element and of the tool mounting coding element, considered appropriate by persons skilled in the art, are likewise conceivable. Preferably, the tool receiving device comprises a multiplicity of mounting coding elements, in particular at least two, preferably at least three, and quite preferably at least four. The tool device comprises, preferably in dependence on a number of mounting coding element of the tool receiving device, an equal number. It is also conceivable, however, for the tool device to have a number of tool mounting coding elements that differs from a number of mounting coding elements of the tool receiving device, in particular a greater number. Preferably, the at least one mounting coding element of the driving device is realized as an axial coding element, in particular as an axial coding element acting along a direction running at least substantially parallel to the output axis. Preferably, the at least one mounting coding element of the driving device is designed to code a possibility for axially placing the tool device onto the driving device. Advantageously, by means of the design according to the disclosure, incorrect mounting of the tool device on the tool receiving device can largely be avoided. Advantageously, it is possible to prevent tool devices that are unsuitable for safe operation of the power tool from being arranged on the tool receiving device. For example, it is advantageously possible to prevent a tool device designed for power tools having a low maximal rotational speed from being arranged on a power tool having a high maximal rotational speed.

Further, it is proposed that the mounting coding element of the driving device be arranged on at least one driving jaw of the driving device. Preferably, the mounting coding element arranged on the at least one driving jaw of the driving device is realized as an extension. Preferably, the mounting coding element of the driving device, realized as an extension, has a main orientation, which points in an orientation away from the output axis, in particular along a direction running transversely, in particular at least substantially perpendicularly, in relation to the output axis. It is also conceivable, however, for the mounting coding element arranged on the at least one driving jaw of the driving device to be of a different design, considered appropriate by persons skilled in the art. Preferably, the mounting coding element arranged on the at least one driving jaw of the driving device is arranged on an outer surface of the at least one driving jaw, in particular on an outer surface facing away from the output axis. Preferably, the mounting coding element arranged on the at least one driving jaw of the driving device is arranged on an outer surface of the at least one driving jaw that runs at least substantially parallel to the output axis. Alternatively or additionally, it is conceivable for the tool receiving device to comprise at least one mounting coding element, which is arranged on the seating surface of the tool receiving device. The mounting coding element arranged on the seating surface of the tool receiving device may be realized as a mechanical or as an electronic mounting coding element. By means of the design according to the disclosure, advantageously, it is largely possible to prevent an unsuitable tool device from being arranged on, in particular placed onto, the tool receiving device. A structurally simple design of a mounting coding element can be achieved.

It is additionally proposed that the mounting coding element of the driving device be arranged so as to adjoin an inner circumferential surface of the at least one driving jaw. Preferably, the mounting coding element arranged on the at least one driving jaw of the driving device is arranged so as to directly adjoin the inner circumferential surface. Alternatively or additionally, it is conceivable for the mounting coding element arranged on the at least one driving jaw of the driving device to be arranged on an outer circumferential surface of the at least one driving jaw. Preferably, a surface of the mounting coding element arranged on the at least one driving jaw of the driving device forms a part of the inner circumferential surface or of the outer circumferential surface of the at least one driving jaw. By means of the design according to the disclosure, a structurally simple design of a mounting coding element can be achieved. Advantageously, it is to a large extent possible to reliably prevent an unsuitable tool device from being arranged on, in particular placed onto, the tool receiving device.

Furthermore, it is proposed that the clamping device, in particular the at least one hook device of the clamping device, comprise at least one mounting coding element. Preferably, the clamping device comprises a multiplicity of mounting coding elements, in particular at least two. It is also conceivable, however, for the clamping device to have a number of mounting coding elements other than one and two, which are arranged on the hook device. Preferably, the at least one mounting coding element of the clamping device forms a fixing coding element, which is designed to code a fastening of the tool device to the tool receiving device. Preferably, the at least one mounting coding element of the clamping device is designed to code a fastening of the tool device to the tool receiving device according to a key-and-keyhole principle. The mounting coding element of the clamping device is preferably designed, in the absence of a corresponding mounting coding element on a tool device, to avoid or prevent, at least to a large extent, the tool device from being fastened to the tool receiving device, in particular to the seating surface, by means of the clamping device. If there is a corresponding mounting coding element present on a tool device, fastening is preferably possible, as a result of a coding release the mounting coding element of the clamping device acting in combination with the corresponding mounting coding element of the tool device. It is conceivable for the tool receiving device to have only at least the mounting coding element or mounting coding elements of the driving device or only at least the mounting coding element or mounting coding elements of the clamping device. It is also conceivable for the tool receiving device, as an alternative or in addition to the mounting coding element or mounting coding elements of the driving device or the mounting coding element or mounting coding elements of the clamping device, to have further coding elements, which enable coding of an arrangement of the tool device on the tool receiving device, such as, for example, at least one coding element that can be moved as a result of an arrangement of the tool device on the tool receiving device in order to release an arrangement of the tool device, at least one additional, static coding element on the tool receiving device that, for example, engages in a cutout on the tool device, at least one additional, movably supported coding element, which is preferably movable after a suitable tool device has been correctly arranged in a coding cutout of the tool device in order, for example, to enable the power tool to be put into operation, or further coding elements, considered appropriate by persons skilled in the art. Preferably, the at least one mounting coding elements of the clamping device is realized as a radial coding element, in particular as a radial coding element acting along a direction running at least substantially perpendicularly in relation to the output axis. Preferably, the at least one mounting coding elements of the clamping device is designed to code a radially acting fastening of the clamping device for the purpose of fastening the tool device to the tool receiving device. Advantageously, a fastening of a tool device by means of the clamping device can be coded by means of the design according to the disclosure. For example, it possible to prevent the possibility of fixing a tool device of an unsuitable design, realized without an element corresponding to the at least one mounting coding element of the clamping device. Fastening of an unsuitable tool device to the tool receiving device can be prevented in a reliable manner.

Further, it is proposed that the mounting coding element of the clamping device be arranged on a hook jaw, in particular in a clamping cutout of the hook jaw. Preferably, the at least one mounting coding element of the clamping device is realized as a single piece with the hook jaw. It is also conceivable, however, for the at least one mounting coding element of the clamping device to be realized separately from the hook jaw, and to be fixed to the hook jaw by means of a connection considered appropriate by persons skilled in the art. Preferably, the mounting coding element of the clamping device is arranged on a clamping surface of the clamping device, in particular directly adjoining the clamping surface, which at least partly delimits the clamping cutout. Preferably, the at least one mounting coding element of the clamping surface is realized as an extension. It is also conceivable, however, for the at least one mounting coding element of the clamping device to be of a different design, considered appropriate by persons skilled in the art. The at least one mounting coding element of the clamping device may be arranged on the hook jaw symmetrically or asymmetrically in relation to a central plane, in particular a plane of symmetry, of the hook jaw. Preferably, the central plane, in particular the plane of symmetry of the hook jaw runs at least substantially parallel to the output axis and/or comprises the latter. It is also conceivable for the at least one mounting coding element of the clamping device to be arranged on the hook jaw spaced apart relative to the central plane, in particular relative to the plane of symmetry, of the hook jaw. Advantageously, a compact design can be realized by means of the design according to the disclosure. Advantageously, it is possible to achieve reliable protection of the mounting coding element of the clamping device against damage, in particular by arrangement of the at least one mounting coding element in the clamping cutout of the hook jaw.

Additionally proposed is a power tool system, comprising at least one power tool according to the disclosure, having a tool receiving device and a tool device that can be received in the tool receiving device, wherein the tool receiving device holds the tool device on the power tool in such a manner that the output axis of the power tool and a tool rotation axis substantially coincide, in particular are coaxial.

In particular, the at least one driving device may have at least one torque transmission region for transmitting a torque, in the circumferential direction around the output axis, to the tool device.

Preferably, the tool device may have a tool rotation axis and a connection device, having a cutout that is designed to at least partly, in particular completely, encompass the tool receiving device of the hand-held power tool in the circumferential direction of the output axis. Preferably, at least the driving device and/or the clamping device of the tool receiving device, when having been arranged on the tool receiving device, engage/engages, at least partly, in the cutout of the connection device of the tool device. The driving device is preferably designed to bear, at least partly, against an edge region of the tool device that delimits the cutout of the connection device of the tool device, in particular when the tool device has been arranged on the tool receiving device.

Preferably, the tool device may have at least one torque take-up region that is spaced apart radially from the tool rotation axis.

Further, preferably, the torque take-up region may delimit the cutout, at least in sections, in the radial direction of the tool rotation axis. Preferably, the torque take-up region of the tool device delimits the cutout of the connection device of the tool device at least partly, in particular completely.

Further, preferably, the driving device and the clamping device may be designed to reach through the cutout of the tool device, and to clamp the tool device to the tool receiving device by means of the clamping device that is movable substantially in the radial direction of the output axis.

Particularly preferably, the clamping device may exert an action of force upon the tool device in the region of the clamping surface, this action of force having at least one component in the axial direction of the tool rotation axis.

Preferably, the clamping device may be configured such that it prevents unintended separation of the tool device from the tool receiving device, and allows easy changing of the tool device.

Further, it may be expedient for the connection device to extend in the axial direction between a first connection surface and a second connection surface of the tool device that faces away from the first connection surface.

In particular, the connection surfaces of the tool device are arranged orthogonally in relation to the tool rotation axis.

Preferably, a distance between the connection surfaces that runs at least substantially parallel to the tool rotation axis forms a material thickness t of the connection device.

Preferably, the at least one torque take-up region is arranged between the connection surfaces of the tool device. Preferably, a driving surface of the torque take-up region that delimits the cutout is arranged between the connection surfaces of the tool device. Preferably, the driving surface of the torque take-up region is oriented at least substantially parallel to the tool rotation axis. It is also conceivable, however, for the driving surface of the torque transmission region to be inclined relative to the tool rotation axis.

The first connection surface may delimit the connection device on a side that faces toward the power tool, in the direction of the output axis. The connection surfaces may be flat.

A particularly compact design of the tool device in the axial direction can be achieved.

Furthermore, it may be expedient for the connection device of the tool device to have at least two, in particular at least four, torque take-up regions that are arranged rotationally symmetrically in relation to each other around the tool rotation axis. In particular, the tool receiving device has at least two, in particular at least four, torque transmission regions that are arranged rotationally symmetrically in relation to each other around the drive axis. In particular, the torque take-up regions are realized so as to correspond, in particular in a contrary manner, with respect to the torque transmission regions, such that, in particular, a negative shape is formed.

The torque transmission regions are arranged, symmetrically in relation to each other, at an angle of 90°, in the circumferential direction around the output axis A, such that the tool device has four rotational positions by which it can be connected to the driving device. This results, advantageously, in ease of operation. Preferably, the torque transmission regions are arranged in an n-fold, in particular at least four-fold, rotational symmetry around the output axis. It is also conceivable, however, for the torque transmission regions to be arranged in a different n-fold symmetry, considered appropriate by persons skilled in the art, such as, for example, a two-fold, three-fold, five-fold, or the like rotational symmetry around the output axis.

Furthermore, it may be expedient for the torque take-up region to extend, in the radial direction of the driving axis, at least in sections, between a first and a second radial distance in relation to the tool rotation axis, and for at least one of these sections to be configured to transmit torque from the power tool to the tool device.

Torques that are applied by the power tool can be transmitted to the tool device, via the tool receiving device, in a particularly advantageous manner.

It is proposed that the tool receiving device have a flat, in particular annular, seating surface, which is designed to support at least one contact surface and/or a the first connection surface of the tool device in the axial direction, such that the seating surface extends, in the radial direction of the tool rotation axis, between a radial inner distance and a radial outer distance from the output axis.

The radial inner distance may form an inner radius of the seating surface that delimits the seating surface. The radial outer distance may form an outer radius of the seating surface that delimits the seating surface.

Preferably, the connection device of the tool device has at least one clamping wing, which delimits the cutout in the radial direction, at least partly, and which is delimited substantially in the radial direction in relation to the tool rotation axis by a first delimiting edge that lies on a first, in particular minimal, delimiting circle around the tool rotation axis.

Preferably, when the tool device has been fastened to the power tool, the clamping wing, in particular the first delimiting edge of the clamping wing, of the tool device projects with respect to the radial inner distance of the seating surface, in the radial direction in relation to the output axis, in particular by up to 2 mm, preferably by up to 1 mm, more preferably by up to 0.6 mm, particularly preferably by up to 0.1 mm, and/or in particular at least 0.5 mm, preferably at least 0.9 mm, more preferably at least 1 mm, such that in this region there is no support material present for supporting the clamping wing.

The clamping wing in this case is not intended to lie on the seating surface in the radial direction, in particular not over the full surface area, such that the clamping wing can be bent elastically in the axial direction, at least in sections. Preferably, the clamping wing has a maximal spring constant D, corresponding to a rate of spring, of less than 400000 N/mm. Preferably, the clamping wing has a maximal spring constant D, corresponding to a rate of spring, having a value from a value range of from of from 10000 N/mm to 350000 N/mm. The maximal spring constant D of the clamping wing corresponding to a rate of spring is preferably given by the following relationship:

F=Dz, wherein $$\frac{3EI}{L^8}, Z = \frac{FL^8}{3EI}, I = \frac{bh^8}{12}$$

with L as a, in particular averaged, maximal extent of the clamping wing between the first delimiting circle and the second delimiting circle, with b as a maximal tangential extent of the clamping wing along the second delimiting circle, and with h as a maximal material thickness of the clamping wing along the axial direction of the tool rotation axis a. The maximal material thickness h may preferably correspond to a value from a value range of from 0.5 mm to 1.6 mm. Preferably, the clamping wing, when the tool device has been arranged on the tool receiving device and has not yet been fastened by the clamping device, is arranged, along a distance running at least substantially parallel to the output axis, at a distance apart from the output axis, at least in section. In particular, as viewed in the axial direction, in particular along the output axis in the direction of the power tool, no seating surface is provided beneath the first delimiting edge of the clamping wing.

It is further proposed that, when the tool device has been fastened to the power tool, the at least one torque transmission region of the tool receiving device lies, in particular is arranged, between a first orthogonal plane, that in particular forms a seating surface, and a second orthogonal plane of the tool receiving device, that in particular delimits a the driving device in the axial direction.

The opening of the tool receiving device may be designed to receive, in particular at least partly, a clamping wing of the tool device that, in particular at least partly, covers the opening, and to enable the clamping wing to move in the axial direction of the output axis, in particular along the output axis, in the direction of the power tool. It is advantageously possible to achieve an elastic deformation of the at least one clamping wing, in the axial direction of the output axis, oriented toward the power tool.

The first and the second orthogonal plane are spaced apart from each other by the distance T. Preferably, the distance T is in a ratio of up to 500%, in particular up to 350%, preferably up to 200%, more preferably up to 150%, particularly preferably up to 100%, with respect to the material thickness t of the connection device of the tool device that is delimited by a maximal axial extent of the torque take-up regions. The tool device can be connected to the driving device, in particular centered on the driving device, in a particularly advantageous manner.

It is further proposed that the tool device have a work region that is configured to act upon a workpiece or a workpiece arrangement.

In particular, the work region may be arranged on the connection device in such a manner that the work region, in a fastening state, projects with respect to the connection device along the tool rotation axis, in a direction oriented toward the tool receiving device of the power tool.

Preferably, the work region may have a contact surface that, with the seating surface of the power tool, when the tool device is in a fastening state, forms a non-positive seating in relation to the power tool in the circumferential direction. It is conceivable for the work region to be flexible. Preferably, the work region may be of a different material from that of the connection device, the material of the work region preferably being more elastic than the material of the connection device. In particular, the tool device can be clamped-in on the work region in the axial direction. The work region can thereby damp vibrations of the tool device.

Further, it may be expedient for the connection device to have at least two clamping wings that are reach respectively delimited, substantially in the radial direction in relation to the tool rotation axis, by a first delimiting edge that forms an extent of the clamping wing in the circumferential direction of the tool rotation axis and that lies on a, in particular minimal, first delimiting circle around the tool rotation axis.

The first delimiting edge may be composed of a plurality of delimiting-edge sections. The delimiting-edge sections may lie substantially on the first delimiting circle and delimit a minimal radial extent of the clamping wing. The delimiting edge may have a first delimiting-edge section in which the tool mounting coding element is arranged. Each clamping wing may have a first delimiting edge.

In particular, the clamping device, in particular at least one hook device of the clamping device, may have a circumferential surface that delimits a radial extent of the clamping device.

Preferably, a distance of at least two mutually adjacent first delimiting edges, in the circumferential direction of the tool rotation axis, may be less than a distance of an, in particular minimal, extent of the circumferential surface of the clamping device in the circumferential direction.

This enables the tool device to be roughly centered, or pre-centered, in a particularly advantageous manner in a placement operation.

Furthermore, it may be expedient for a torque transmission region, preferably a plurality of torque transmission regions, particularly preferably all torque transmission regions of the power tool, to contact the torque take-up regions of the tool device, at least in sections, in the form of a punctiform contact, preferably in the form of a linear contact, and particularly preferably in the form of a surface contact. The at least one torque transmission region can thereby contact the tool device in a particularly advantageous manner.

Additionally proposed is a tool device having a work region that is configured to act upon a workpiece or a workpiece arrangement, and having a connection device that is configured to take up driving forces, and having a connection region, which connects the work region and the connection device and which is configured to transmit driving forces of the power tool, by means of the connection region, from the connection device to the work region, for use with a power tool.

Furthermore, it is proposed that the tool device have at least one tool mounting coding element, which is designed, when the tool device has been arranged on the tool receiving device, to act in combination with at least one mounting coding element of the tool receiving device. Preferably, the tool mounting coding element of the tool device is realized as a mechanical tool mounting coding element, such as, for example, as a cutout, as an extension, as a groove, as a web, as a stamping, or the like. It is also conceivable, however, for the tool mounting coding element of the tool device to be realized as an electronic tool mounting coding element, such as, for example, as an RFID chip, as an NFC chip, as a radio-wave evaluation device, as an electronic read device (bar-code reader, data matrix code reader, etc.), or the like, or for the tool mounting coding element of the tool device to be realized as a combination of a mechanical and an electronic tool mounting coding element. Preferably, the tool mounting coding element of the tool device is designed to act in combination with at least one mounting coding element of the driving device or with at least one mounting coding element of the clamping device, according to a key-and-keyhole principle, in particular when the tool device has been arranged on the tool receiving device. Preferably, the tool device comprises a multiplicity of tool mounting coding element, in particular at least two, preferably at least three, and quite preferably at least four. The tool device preferably comprises, preferably in dependence on a number of mounting coding element of the tool receiving device, an equal number. It is also conceivable, however, for the tool device to have a number of tool mounting coding elements that differs from a number of mounting coding elements of the tool receiving device, in particular a greater number. The at least one tool mounting coding element of the tool device may preferably be realized or act as a stress relieving notch, in particular in addition to a mounting coding function. Preferably, for the purpose of mounting and/or fastening the tool device on the tool receiving device, a mechanical and/or electronic evaluation of the at least one tool mounting coding element of the tool device is to be provided, in particular by means of the at least one mounting coding element of the tool receiving device, in order preferably to enable the tool device to be mounted and/or fastened on the tool receiving device. It is conceivable that a movement of the clamping device can be blocked, in particular mechanically and/or electronically, until mounting and/or fastening is enabled. It is conceivable for the at least one tool mounting coding element of the tool device to be designed to actuate, in particular to move, the at least one mounting coding element of the tool receiving device, in particular to enable the tool device to be mounted and/or fastened on the tool receiving device. Alternatively or additionally, it is conceivable for the tool device to have at least one further tool mounting coding element, in particular a stamping, which is designed to actuate, in particular to move, at least one further mounting coding element of the tool receiving device, which is particular is movably supported, in particular on the seating surface, to enable the tool device to be mounted and/or fastened on the tool receiving device. Advantageously, by means of the design according to the disclosure, incorrect mounting of the tool device on the tool receiving device can largely be avoided. Advantageously, it is possible to prevent tool devices that are unsuitable for safe operation of the power tool from being arranged on the tool receiving device. For example, it is advantageously possible to prevent a tool device designed for power tools having a low maximal rotational speed from being arranged on a power tool having a high maximal rotational speed. Advantageously, a high degree of operator safety can be realized.

Further, it is proposed that the at least one tool mounting coding element be arranged on at least one clamping wing of the connection device. If the tool mounting coding element arranged on the clamping wing is designed as a cutout, the tool mounting coding element is preferably made in the clamping wing in such a manner that a resistance property of the clamping wing against a plastic deformation as a result of an operational load is reduced maximally to a load limit of the clamping wing. It is conceivable for at least one stiffening element such as, for example, a stiffening rib or the like, to be arranged on the clamping wing. The at least one tool mounting coding element arranged on the clamping wing is preferably designed, when the tool device has been arranged on the tool receiving device, to act in combination with the at least one mounting coding element of the clamping device arranged on the hook jaw. Advantageously, a safe mounting coding or fastening coding, according to a key-and-keyhole principle, can be achieved by means of the design according to the disclosure.

It is additionally proposed that the at least one tool mounting coding element has, along a radial axis, a maximal extent that corresponds maximally to a maximal distance between a first delimiting circle and a second delimiting circle of the connection device. Preferably, the at least one tool mounting coding element arranged on the clamping wing has a maximal extent, along a direction running transversely, in particular at least substantially perpendicularly, in relation to the tool rotation axis, in particular along a radial axis of the tool device, that is equal to or less than a maximal distance between a first limiting circle and a second limiting circle of the tool device. Advantageously, a reliable and safe coding can be achieved by means of the design according to the disclosure.

Furthermore, it is proposed that the at least one tool mounting coding element is arranged, in an angular range between a drive edge and a coding edge of the connection device, on a clamping wing of the connection device. In particular, the angular range has a maximal extent of less than 90°, preferably of less than 60°, and particularly preferably of less than 40°. Advantageously, a safe fastening coding can be achieved by means of the design according to the disclosure. Advantageously, it is to a large extent possible to prevent the tool device from being fastened to unsuitable power tools. Advantageously, it is possible to prevent an operator from being injured as a result of the tool device being fastened to unsuitable power tools.

Additionally proposed is the use of a tool device with a power tool designed as an angle grinder, such that the tool device is operable at a rotational speed of more than 4000 or more than 10000 or more than 20000 revolutions per minute about the output axis.

"Operable" in this context is to be understood to mean operable in a reliable manner, such that a use of a tool device with a power tool, in particular an angle grinder, corresponds to a usage time, or service life, of the tool device that is equal, or at least approximately similar, in length to, for example, to a fiber grinding disk used with an angle grinder. Service life understood to mean, in the field of grinding tools, a usual service life of a grinding means driven by means of an angle grinder.

It is further proposed that the tool device have a work region connected, in particular in a materially bonded and/or positive manner, to a carrier flange of the tool device, for performing work on a workpiece. A particularly advantageous separation of the functions can thereby be achieved.

The power tool according to the disclosure, the power-tool system according to the disclosure and/or the tool device according to the disclosure are/is not intended in this case to be limited to the application and embodiment described above. In particular, the power tool according to the disclosure, the power-tool system according to the disclosure and/or the tool device according to the disclosure may have individual elements, component parts and units, and procedure steps, that differ in number from a number stated herein, in order to fulfill an operating principle described herein. Moreover, in the case of the value ranges specified in this disclosure, values lying within the stated limits are also to be deemed as disclosed and applicable in any manner.

BRIEF DESCRIPTION OF THE DRAWINGS

Further advantages are disclosed by the following description of the drawing. Exemplary embodiments of the disclosure is represented in the drawing. The drawings, the description and the claims contain numerous features in combination. Persons skilled in the art will also expediently consider the features individually and combine them to create appropriate further combinations. There are shown:

DETAILED DESCRIPTION

In the following figures, component parts that are the same are denoted by the same references.

Figure 1:
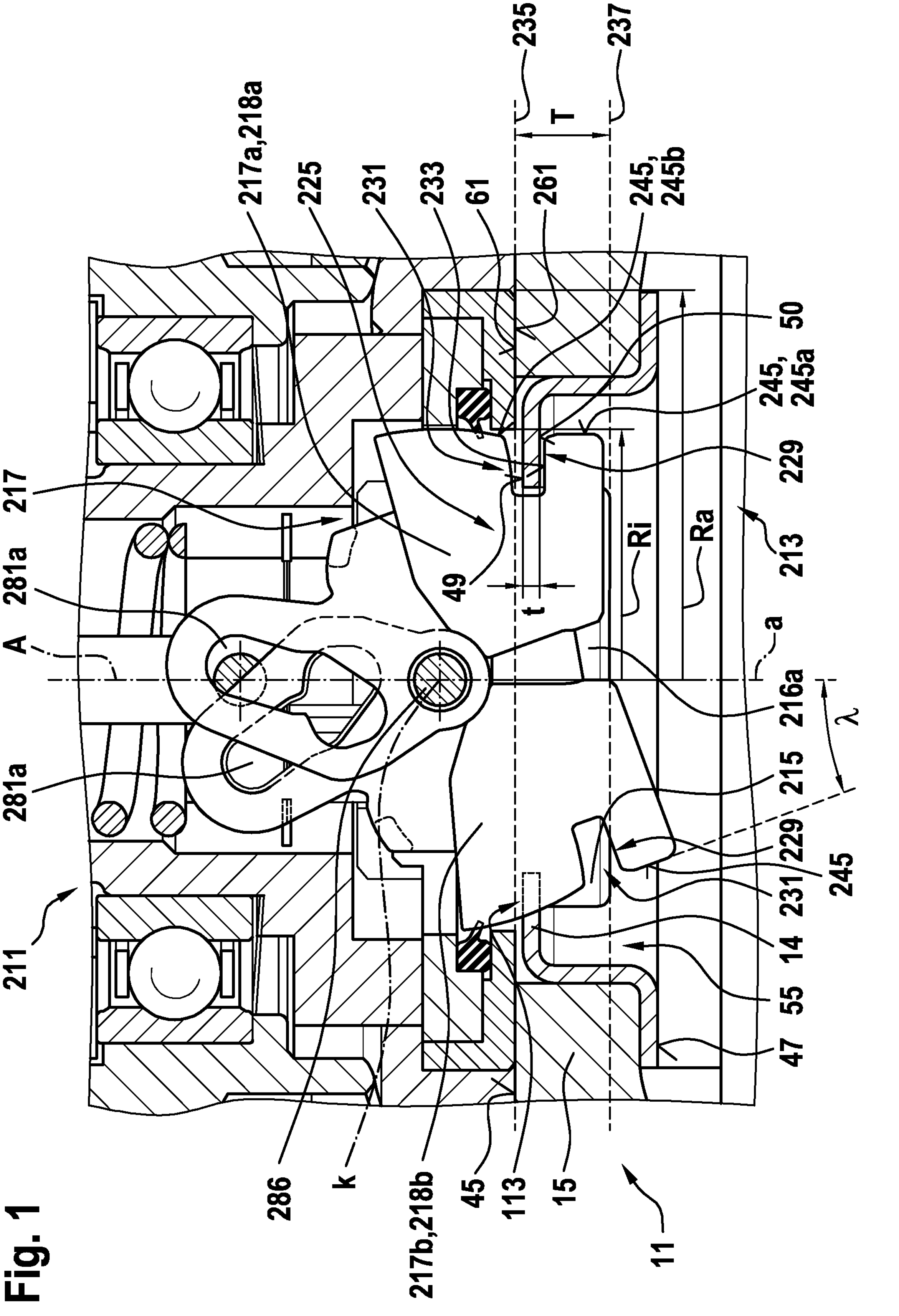
FIG. 1 a section through the tool receiving device, according to the disclosure, of a hand-held power tool with a tool device, FIG. 2 a further section through the tool receiving device with a tool device, in a fastening state, FIG. 3 a further section through the tool receiving device, in a release state, FIG. 4 a view of the tool receiving device from FIG. 1, FIG. 5*a* a view of a part of the tool receiving device from FIG. 4, FIG. 5*b* a view of a part of a first alternative tool receiving device, FIG. 5*c* a view of a part of a second alternative tool receiving device, FIG. 5*d* a view of a part of a third alternative tool receiving device, FIG. 5*e* a view of a part of a fourth alternative tool receiving device, FIG. 6 a perspective view of the tool receiving device from FIG. 3, FIG. 7 a perspective view of the tool receiving device from FIG. 2, FIG. 8 a further perspective view of the tool receiving device, FIG. 9 a further perspective view of the tool receiving device with a tool device, FIG. 10 a further perspective view of the tool receiving device with a further tool device, FIG. 11 a view of an exemplary tool device and FIG. 12 a view of the tool device from FIG. 11 received in the tool receiving device from FIG. 1, FIG. 13 a sectional view of the tool receiving device along a first orthogonal plane from FIG. 1, FIG. 14 a carrier flange of an embodiment of a tool device, FIG. 15 an enlarged view of a clamping wing of the carrier flange from FIG. 11, FIG. 16*a* a design of a tool device and/or of a tool receiving device with at least one spring-loaded securing and/or positioning element, FIG. 16*b* a design, alternative to FIG. 16*a*, of the tool device and/or of the tool receiving device with at least one spring-loaded securing and/or positioning element, FIG. 17 a detail view of a hook jaw of the tool receiving device with, arranged thereon, a mounting coding element of a clamping device of the tool receiving device, and FIG. 18 a tabular listing of possible arrangements and designs of tool mounting coding elements of the tool device.

FIG. 1 shows a power-tool system, or machining system, having a tool receiving device 213 that can be moved in rotation about an output axis A, and having a tool device 11. The tool receiving device 213 is configured to hold a tool device 11 on the power tool 211 in such a manner that the output axis A and a notional geometric tool rotation axis a substantially coincide.

Tool Device:

As shown by FIG. 1, FIG. 2 and FIGS. 9 to 12, The tool device 11 may be of a flat and at least substantially disc-shaped design. The tool device 11 has a notional tool rotation axis a, and a connection device for connecting the tool device 11 to a tool receiving device 213 of the power tool 211, and a work region 15. The connection device 113 and the work region 15 are preferably realized integrally with each other, in particular materially bonded to each other.

The tool rotation axis a defines a center point of the tool device 11, about which the tool device 11 rotates when in operation with a power tool 211. The connection device 113 is arranged in a radially inner region of the tool device 11, around the tool rotation axis a.

The connection device 113 has a cutout 17, which forms a material opening through the tool device 11 and which extends, in the axial direction of the tool rotation axis a, through an entire material thickness t of the connection device 113. The cutout 17 may be designed to completely encompass a driving device 215 and a clamping device 217 of the tool receiving device 213. The cutout 17 completely surrounds the tool rotation axis a in at least one plane, such as, for example, an orthogonal plane extending orthogonally in relation to the tool rotation axis a.

The connection device 113 can be fastened to the tool receiving device 213 in such a manner that an output axis A of an output shaft and the tool rotation axis a of the tool device 11 substantially coincide.

Figure 11:
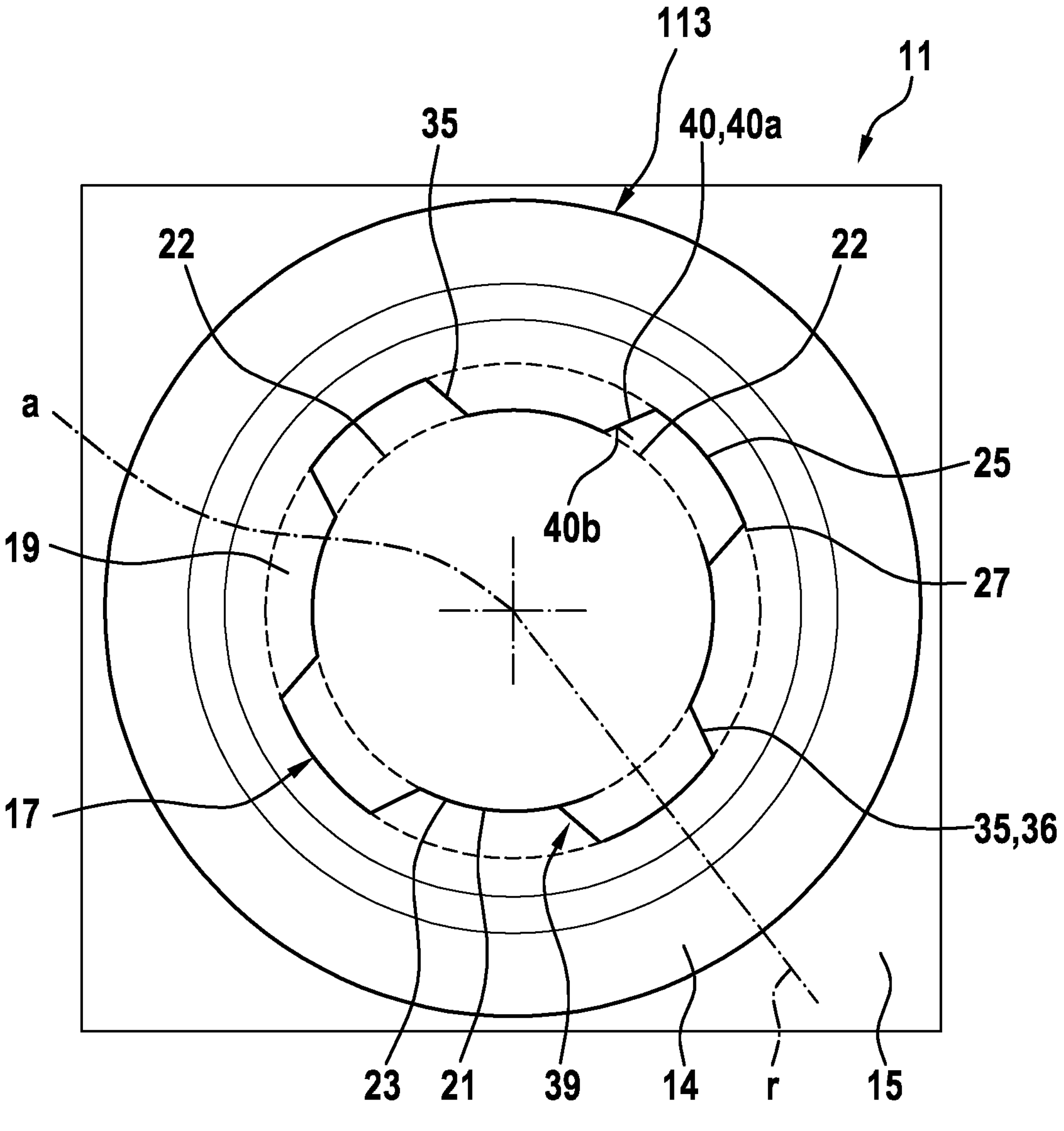
Figure 12:
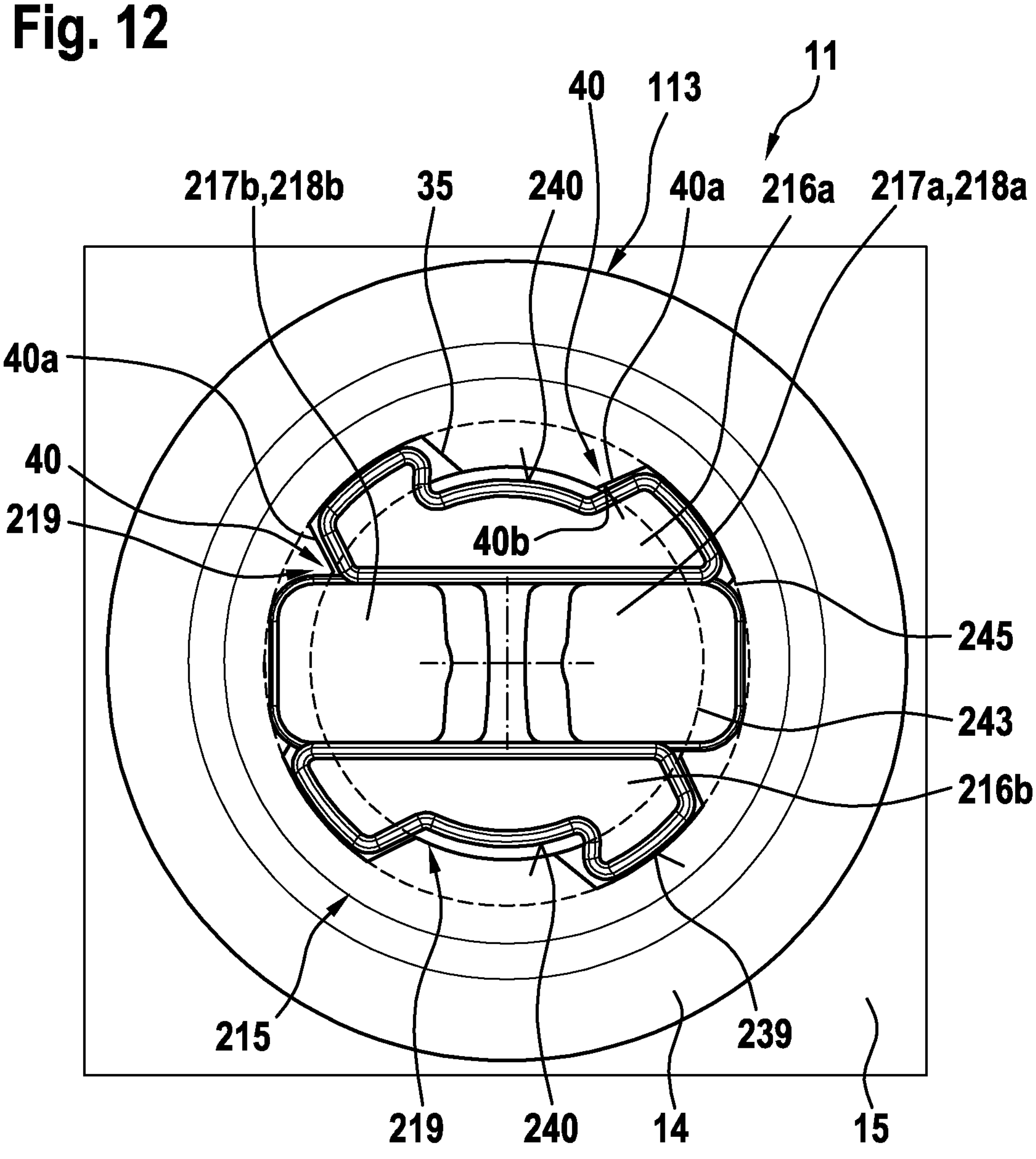

The connection device 113 additionally has four clamping wings 19, which extend toward the tool rotation axis a in the radial direction and, at least in sections, delimit the cutout 17 of the connection device 113 in the radial direction, as can be seen in FIGS. 11 and 12. The clamping wings 19 are delimited, in particular, substantially in a direction radial to the tool rotation axis a, by a respective first delimiting edge 21 that lies on a first, in particular minimal, delimiting circle 23 around the tool rotation axis a. Alternatively, however, the connection device 113 may also have fewer than four clamping wings 19, such as, for example, two clamping wings 19, or more than four clamping wings 19, such as, for example, six clamping wings 19.

The clamping wings 19 are delimited, in particular substantially, in the radial direction and/or in the circumferential direction of the tool rotation axis a, by a respective second delimiting edge 25 that lies on a second, in particular maximal, delimiting circle 27 around the tool rotation axis a. In particular, a diameter of the first delimiting circle 23 is smaller than a diameter of the second delimiting circle 27. Preferably, the first delimiting edges 25 and the second delimiting edges 25 delimit the cutout 17, at least in sections, in the direction radial of the tool rotation axis a. The first delimiting circle 23 is arranged, concentrically in relation to the second delimiting circle 27, around the tool rotation axis a. The first diameter of the first delimiting edge 23 is approximately 22 mm in size, as a result of which the tool device 11 also fits conventional power tools, in particular angle grinders, such that backward compatibility is assured. Alternatively, the first diameter of the first delimiting edge 23 may also be smaller than 22 mm, such that the tool device also fits on conventional power tools, in particular angle grinders, of smaller dimensions.

The second delimiting edge 25 may be configured to centre and support the tool device 11 in the radial direction.

The first delimiting edge 21 may be curved around the tool rotation axis a, corresponding to a circular arc course of the delimiting circle 23. The second delimiting edge 25 may be curved around the tool rotation axis a, corresponding to a circular arc course of the delimiting circle 27.

The connection device 113 has a torque take-up region 40. The torque take-up region 40 has a, in particular rectilinear or curved, drive edge 40*a*, and a, in particular flat or curved, drive surface 40*b*. The torque take-up region 40 of the tool device 11 can thereby contact a torque transmission region 219 of the tool receiving device 213, in particular in the form of a punctiform contact, preferably in the form of a linear contact, more preferably in the form of a surface contact. The torque transmission region 219 is arranged at a distance from the tool rotation axis a.

The torque take-up region 40 of the connection device 113 is designed to transfer driving forces from the power tool 211 to the tool device 11. The torque take-up region 40 is arranged, in the axial direction of the tool rotation axis a, between the cutout 17 of the tool device 11 that extends through the entire material thickness of the tool device 11. The cutout 17 has at least four torque take-up regions 40, which are arranged in rotational symmetry in relation to each other around the tool rotation axis a, in particular in an n-fold rotational symmetry. It is also conceivable, however, for the tool device to have a number of torque take-up regions 40 other than four, such as, for example, two, three or more than four torque take-up regions 40.

The drive surface 40*b*, in particular a drive surface region of the drive surface 40*b*, is designed to provide a positive and/or non-positive connection, in particular able to operate the tool device 11 in rotation, to the tool receiving device 213 of the power tool 211. The drive surface 40*b* is delimited by at least one drive edge 40*a* in the axial direction of the tool rotation axis a. At least the drive surface region of the drive surface 40*b* is of a flat design.

The drive surface 40*b* is angled, in particular at an angle of up to 30°, such as, for example, 25°, in relation to a radial direction forming a radial axis r in relation to the tool rotation axis a, as can be seen in FIGS. 11 and 12.

The connection device 113 has a first connection surface 49 and, facing away from the first connection surface 49, a second connection surface 50. These connection surfaces 49, 50 are arranged orthogonally in relation to the tool rotation axis a, and preferably delimit a material thickness t of the connection device 113. The at least one torque take-up region 40 extends between the connection surfaces 49, 50.

The first delimiting edge 21 is delimited, in the circumferential direction around the tool rotation axis a, by a coding edge 35, in particular a coding edge region of the coding edge 35, and a drive edge 40*a*, in particular a drive edge region of the drive edge 40*a*, as can be seen, for example, in FIG. 11 or FIG. 12. At least the drive edge region of the drive edge 40*a* is rectilinear. At least the coding edge region of the coding edge 35 is rectilinear. At least the coding edge 35 is substantially curved.

The coding edge 35 connects the first delimiting edge 21 to the second delimiting edge 25. The drive edge 40*a* in this case connects the first delimiting circle 21 to an adjacent, second delimiting edge 25. The coding edge 35 and the drive edge 40*a* extend in an orthogonal plane transversely in relation to the tool rotation axis a, in particular substantially in the radial direction. In particular, the orthogonal plane extends substantially orthogonally in relation to the tool rotation axis a.

The first delimiting circle 23 has at least one notional projection edge 22, which lies between two first delimiting edges 21 that are adjacent in the circumferential direction, and which lies on the first delimiting circle 23 and extends concentrically in relation to the first delimiting circle 23, in the circumferential direction around the tool rotation axis a. In this case, an extent in the circumferential direction of the at least one first delimiting edge 21 lying on the first delimiting circle 23 is up to 10% greater than an extent of adjacent notional projection edge 22 lying on the first delimiting circle. Preferably a projection edge 22, in particular each projection edge 22, is smaller than a first delimiting edge 21 adjacent to the projection edge 22. A particular advantageous centering, in particular pre-centering, or rough centering, of the tool device 11 can thereby be achieved.

The clamping wings 19 may be delimited, in particular substantially, in a direction radial to the tool rotation axis a, by a respective second delimiting edge 25 that lies on a second, in particular maximal, delimiting circle 27 around the tool rotation axis a.

The delimiting edges 21, 25, the coding edges 35 and the drive edges 40*a* in this case form a delimiting contour of the cutout 17. In particular, the first delimiting edge 21, the coding edge 35 and the drive edge 40*a* form a contour of the clamping wing 19. The drive edge 40*a* and the coding edge 35 delimit the first delimiting edge 21 in the circumferential direction around the tool rotation axis a, and adjoin the first delimiting edge 21.

The clamping wings 19 are arranged symmetrically in the circumferential direction around the tool rotation axis a. The clamping wings 19 are arranged with a mutual offset of 90° in the circumferential direction around the tool rotation axis a, such that four rotational positions are obtained in the case of one complete revolution of the tool device 11, by 360°, about the tool rotation axis a. Alternatively, the clamping wings 19 may be arranged with a mutual offset of 180° or 60° in the circumferential direction around the tool rotation axis a, such that two or six rotation positions are obtained in the case of one complete revolution of the tool device 11, by 360°, about the tool rotation axis a.

The clamping wings 19 extend, at least substantially, along an orthogonal plane extending in the radial direction radial of the tool rotation axis a. In particular, the orthogonal plane extends substantially orthogonally in relation to the tool rotation axis a.

In particular, the delimiting contour of the cutout 17 has, at least in sections, a coding realized as a coding edge 35*a*, realized symmetrically around the tool rotation axis a. The delimiting contour may advantageously be realized asymmetrically, in particular not axially symmetrically, around the tool rotation axis. In an advantageous embodiment according to FIGS. 11 and 12, the delimiting contour may be realized symmetrically around the tool rotation axis a, in particular according to an n-fold rotational symmetry.

In an embodiment represented in FIG. 11 and FIG. 12, the clamping wing 19 extends at least substantially along a plane orthogonal to the tool rotation axis a, and is symmetrical, in particular axially symmetrical, with respect to a radial direction of the tool rotation axis a, forming a radial axis r, of a plane spanned by a radial and an axial direction of the tool rotation axis a.

In an alternative embodiment, the clamping wing 19 may be symmetrical, in particular mirror-symmetrical, with respect to plane of symmetry spanned by a radial and an axial direction of the tool rotation axis a.

In an embodiment not represented in greater detail, the clamping wing 19 extends at least substantially along a plane orthogonal to the tool rotation axis a, and is asymmetrical, in particular is not axially symmetrical, with respect to a radial direction of the tool rotation axis a, forming a radial axis r, of a plane of symmetry spanned by a radial and an axial direction of the tool rotation axis a.

The tool device 11 has a first lateral surface 45, which is oriented toward the power tool 211 when the tool device 11 is in a fastened fastening state on the tool receiving device 213. The tool device 11 has a second lateral surface 47, which faces away from the first lateral surface 45, and which is oriented away from the power tool 211 when the tool device 11, on the tool receiving device 213, is in a fastening state in which it is fastened to the power tool 211. The first lateral surface 45 and the second lateral surface 47 delimit the tool device 11 in the axial direction in relation to the tool rotation axis a.

The first lateral surface 45 of the tool device 11 has, in particular, a radially inner first lateral-surface region 46 that is designed to form a contact surface 61 for seating on a tool receiving device 213 of the power tool 211.

The work region 15 is disk-shaped and flat. The work region 15 is radially external, and delimits the radial extent of the tool device 11. The work region 15 may be embodied as a grinding tool, having at least one grinding element realized as an abrasive grain or as an abrasive edge, or as a parting-off tool, having a cutting edge or at least one cutting tooth. This, however, is not intended to be limiting, since persons skilled in the art may also envisage other fields of work known to persons skilled in the art.

The connection device 113, which is configured to take up driving forces, is connected, in particular connected in a materially bonded manner, to the work region 15 by means of a connection region 55 that is configured to transmit driving forces of the power tool 211 from the connection device 113 to the work region 15.

Power Tool and Power-Tool System:

The tool receiving device 213 comprises at least the driving device 215, and the clamping device 217, which can be moved relative to the driving device 215.

The clamping device 217 has two hook devices 217*a*, 217*b*, realized as hook jaws 218*a*, 218*b*, which are supported so as to be rotatable relative to each other about a clamping-device rotation axis k of the clamping device 217.

To facilitate illustration, in FIG. 1 the hook jaws 218*a*, 218*b* are arranged in a notional state, namely, in a fastening state (right hook jaw 218*a*) and in a release state (left hook jaw 218*b*). This notional state of the hook jaws 218*a*, 218*b* is preferably not achievable in the case of the power tool 211 according to the disclosure, since both hook jaws 218*a*, 218*b* are arranged either in the fastening state or in the release state.

Figure 3:
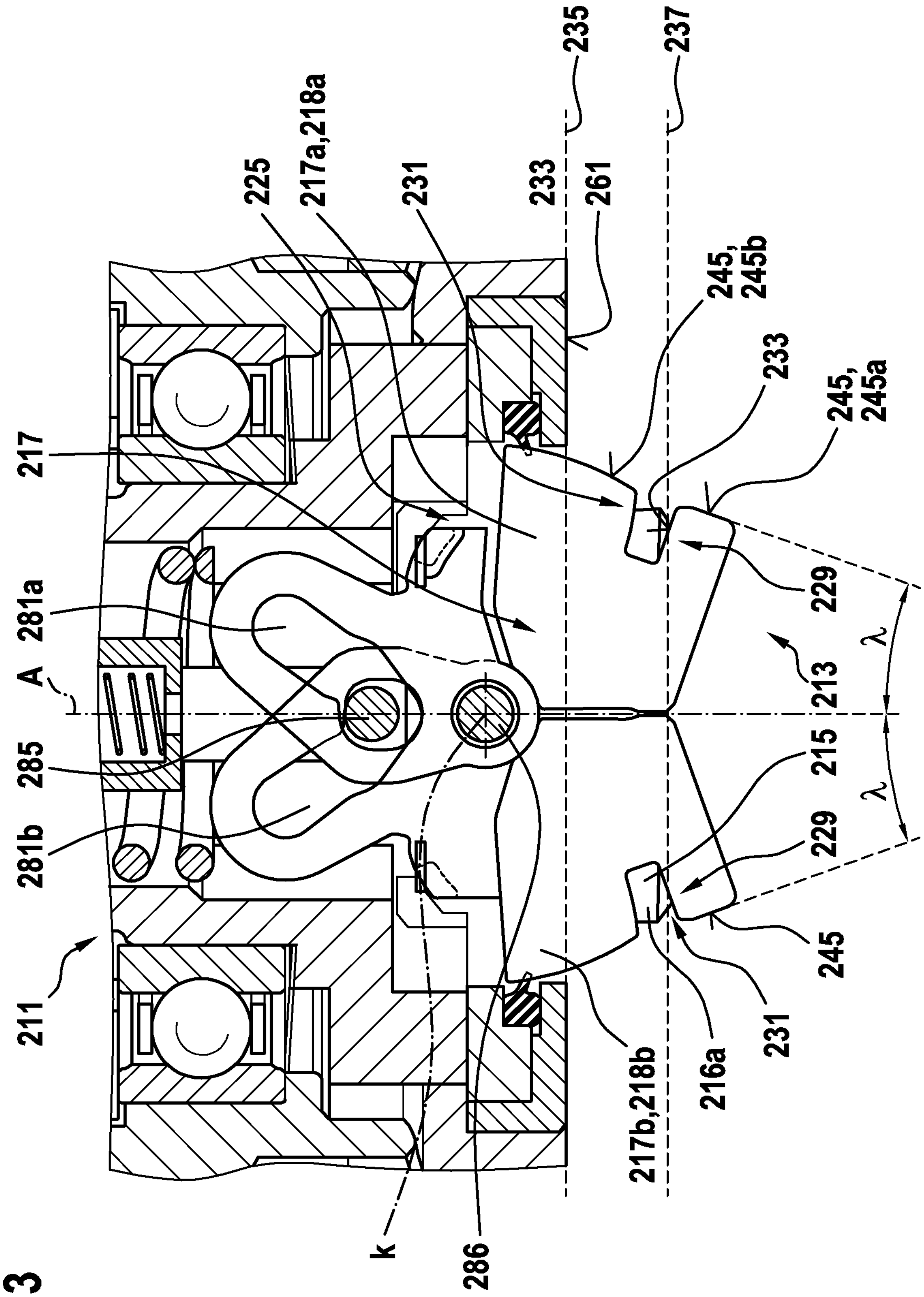

When the clamping device 217 is in a release state, the hook jaws 218*a*, 218*b* project with respect to the driving device 215 in the axial direction in relation to the output axis A, as can be seen, for example, from the left hook jaw 218*a* in FIG. 3. When the tool receiving device 213 is in a release state, the hook jaws 218*a*, 218*b* in this case project farther with respect to the driving device 215 in the axial direction in relation to the output axis A than in a fastening state.

The notional state of the hook jaws 218*a*, 218*b* is preferably not achievable in the case of the power tool 211 according to the disclosure, since the power tool 211 has a guide device that guides a movement of the hook jaws 218*a*, 218*b* in such a manner that a movement of both hook jaws 218*a*, 218*b* in relation to each other is effected substantially symmetrically.

The expression "guide device" is intended here to define, in particular, a device intended to exert a constraining force upon the clamping device 217, at least along a clamping direction, axially in relation to the output axis A and/or radially in relation to the output axis A of the clamping device, in order to predefine a movement of the clamping device 217 along the clamping direction. For this purpose, the guide device has at least one guide element, realized as a guide pin 285, on or about which the clamping device 217 is guided, and at least one bearing element, realized as a bearing pin 286, that is designed to carry the hook jaws 218*a*, 218*b* so as to be rotatable about a clamping-device rotation axis k of the bearing pin 286.

The guide device has two guide cutouts, realized as guide slots, which each form a guide path for guiding the hook jaws 218*a*, 218*b*.

Both hook jaws 218*a*, 218*b* each respectively comprise the guide slot 281*a*, 281*b*, which is designed to guide the hook jaws 218*a*, 218*b* by means of the guide pin 285. The two hook jaws 218*a*, 218*b* are symmetrical in relation to each other. The guide slots 281*a*, 281*b* of the hook jaws 218*a*, 218*b* are symmetrical in relation to each other. Preferably, the movement of the two hook jaws 218*a*, 218*b* is substantially symmetrically, such that both hook jaws 218*a*, 218*b* are arranged either in a fastening position or in a release position.

Figure 2:
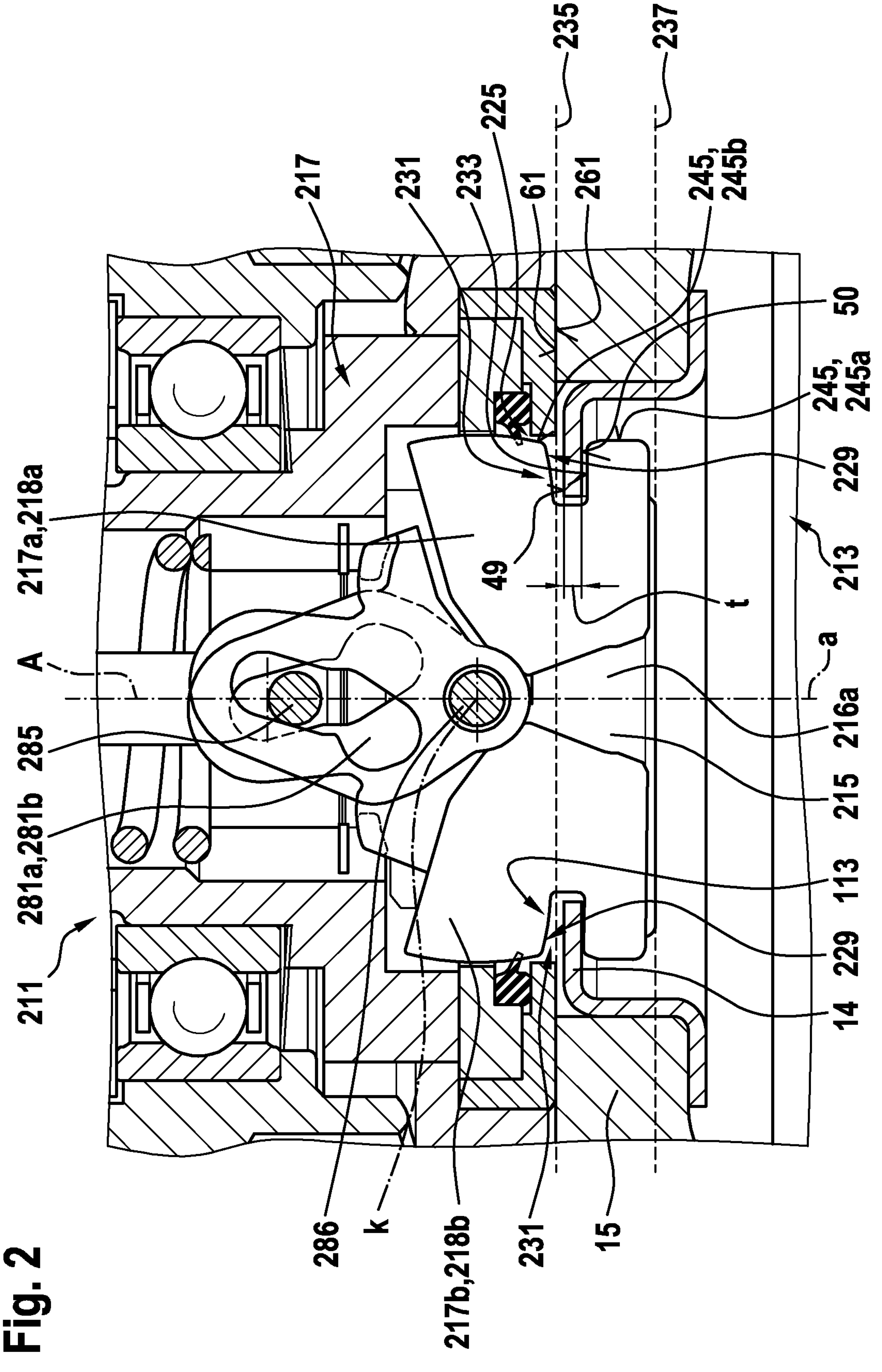

When the clamping device 217 is in a release state, in which the hook jaws 218*a*, 218*b* are arranged in the release position, the hook jaws 218*a*, 218*b* project in the axial direction of the output axis A with respect to the driving device 215, as can be seen, for example, in FIG. 2 or from the left hook jaw 218*a* in FIG. 1. The right hook jaw 218*b* from FIG. 1 is embodied with the clamping device 217 in a fastening state. When the tool receiving device 213 is in a release state, the hook jaws 218*a*, 218*b* project farther in the axial direction of the output axis A with respect to the driving device 215 than in a fastening state, in which the hook jaws 218*a*, 218*b* are arranged in the fastening position.

The guide pin 285 extends orthogonally in relation to the output axis A. The guide pin 285 comprises the clamping-device rotation axis k, in particular the guide pin 285 forms the clamping-device rotation axis k. The hook jaws 218*a*, 218*b* are supported so as to be pivotable about the clamping-device rotation axis k.

By means of the hook jaws 218*a*, 218*b*, tool devices 11 of differing material thicknesses t of the connection devices 113 can be clamped in the tool receiving device 213, in dependence on pivot angle, angled with respect to the output axis A, of a clamping surface 233 of the clamping device 217.

The hook jaws 218*a*, 218*b* each have at least one radial clamping cutout 231, which is designed to clamp the tool device 11 in a fastening state, at least in the axial direction of the output axis A, and to release it in a release state. The clamping cutouts 231 each have at least one clamping surface 233 for transmitting an at least axial action of force to the tool device 11. The clamping cutout 231 is embodied as a clamping depression extending in the radial direction of the output axis A. In the fastening state, the clamping surface 233 extends substantially in the radial direction of the tool rotation axis a. The clamping surface 233 is oriented, in the axial direction of the output axis A, toward the power tool 211. The clamping surface 233 is of a flat design. The clamping surface 233 may be of a curved design, at least in section. Preferably, the clamping surface 233 contacts the connection device 113 of the tool device 11, at least in sections, in the form of a punctiform contact, preferably in the form of a linear contact, and particularly preferably in the form of a surface contact. The form of the contact in the tool receiving device 213 in this case may change in dependence on the material thickness t of the connection device 113 to be connected to the tool receiving device 213. In particular, the form of the contact may change in dependence on an elastic deflection of the clamping wings 19 of the tool device 11 in the axial direction of the output axis A.

In a fastening state, the hook jaws 218*a*, 218*b* cover the clamping wings 19 in the radial direction of the output axis A by up to 4 mm, in particular by up to 3 mm.

The hook jaws 218*a*, 218*b* of the clamping device 217 each have at least one circumferential surface 245 that delimits a maximal radial extent of the hook jaws 218*a*, 218*b*. The circumferential surfaces 245 of the hook jaws 218*a*, 218*b* are oriented away from each other. The hook jaws 218*a*, 218*b* each have a first circumferential surface 245*a* and a second circumferential surface 245*b*, which are separated in the axial direction by the clamping cutouts 231. The first and the second circumferential surface 245*a*, 245*b* each delimit a radial extent of the clamping cutout 231 assigned to the circumferential surfaces 245*a* 245*b*. The first circumferential surface 245*a* is curved at least about the output axis A.

In a release state, the circumferential surfaces 245 of the hook jaws 218*a*, 218*b* projects in the axial direction in relation to the output axis A with respect to the driving jaws 216*a*, 216*b*. In a release state, the circumferential surface 245 of the hook jaws 218*a*, 218*b* is angled with respect to the output axis A in such a manner that a distance of the circumferential surface from the output axis A decreases in an axial direction of the output axis A going away from the tool receiving device, or the power tool. In a release state, the circumferential surface 245 of the clamping device 231 may form, with respect to the output axis A, an angle λ (FIG. 1) that is greater than 20° and less than 30°.

The clamping cutouts 231 are designed to receive the tool device, at least partly. The clamping cutouts 231 are designed to receive the tool device, at least partly, in a release state. The clamping cutouts 231 are designed to receive the tool device in a fastening state and to hold it on the tool receiving device. In a release state, the clamping cutouts 231 project in the axial direction, at least partly, with respect to the driving jaws 216*a*, 216*b*. In a release state, the clamping cutouts 231 project with respect to the driving jaws 216*a*, 216*b* in such a manner that the connection device 113 of the tool device is received by the clamping cutouts 231. In a release state, the clamping cutouts 231 are angled with respect to the output axis A in such a manner that the connection device 113 of the tool device 11 is received by the clamping cutouts 231. The clamping cutouts 231 are realized as circumferential cutouts. The clamping cutouts 231 may be realized in such a manner that, in a clamping state, the clamping cutouts 231 opens, at least partly, in the axial direction of the output axis A in order to receive the tool device 11, in particular the connection device 113 of the tool device 11.

The tool receiving device 213 has a substantially rectangular opening 225 that is designed to receive the hook jaws 218*a*, 218*b*, and in particular to support them movably in the axial direction of the output axis A. The opening 225 surrounds the hook jaws 218*a*, 218*b* in an orthogonal plane by up to 360°.

The hook jaws 218*a*, 218*b* project in the axial direction with respect to the opening. The opening 225 is delimited, at least in sections, by the second attachment surface. The opening 225 can receive, or support, the hook jaws 218*a*, 218*b* such that they are non-rotatable about the output axis A. The opening 225 may be elongate in a radial plane.

The driving device 215 and the clamping device 217 are configured to reach through a single cutout 17 of the tool device 11 that extends through the entire material thickness t of the tool device 11, and to clamp the tool device 11 to the tool receiving device 213 by means of the hook jaws 218*a*, 218*b* that are movable substantially in a direction radial to the output axis A.

Figure 4:
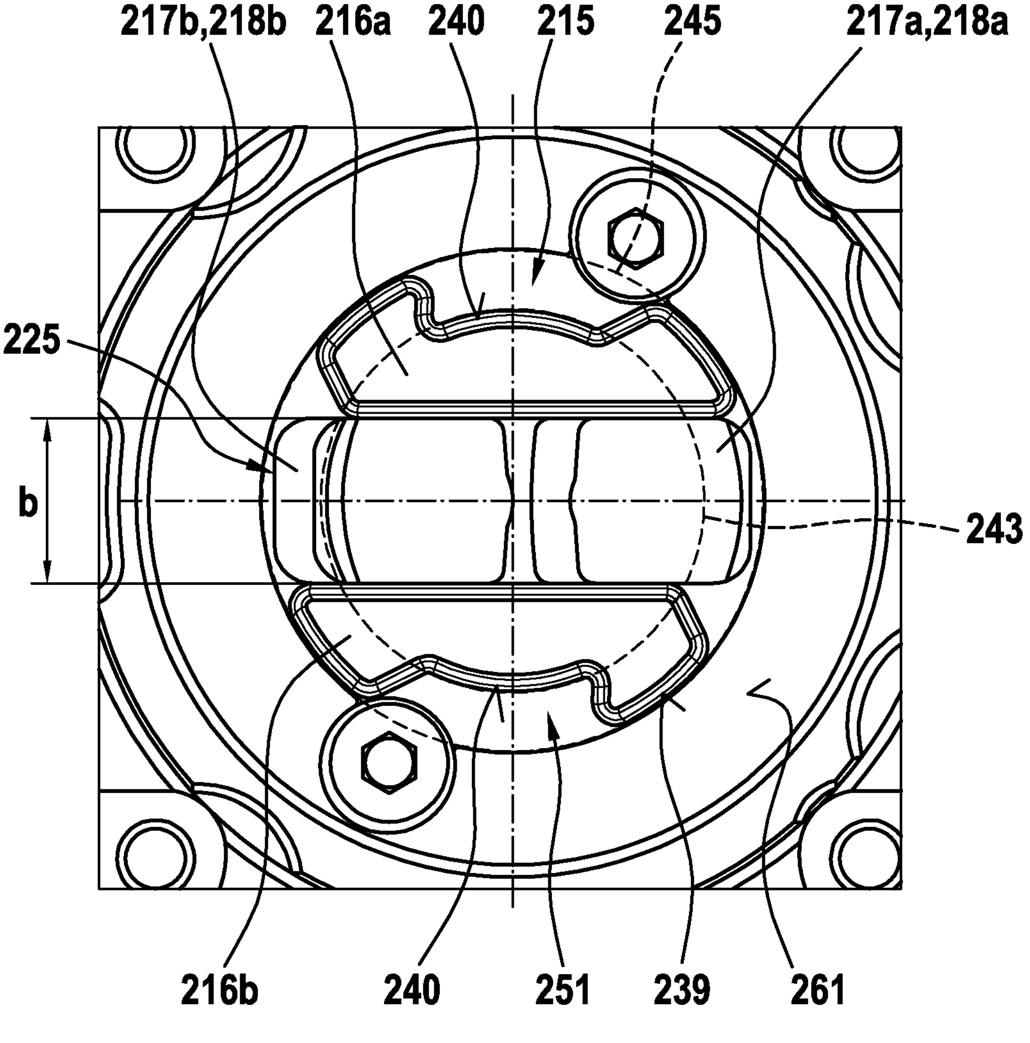

As represented in FIG. 4, for the purpose of transmitting a driving force to the tool device 11, the driving device 215 has four torque transmission regions 219, arranged in a star configuration at a distance from this output axis A. At least one torque transmission region 219 in this case may be realized as a rectilinear output edge 219*a*, in particular as an output edge region, or as a flat output surface 219*b*, in particular as an output surface region. The output edges 219*a* and the output surfaces 219*b* extend at least substantially parallel to a radial direction in relation to the output axis A.

When the power tool 211 is in operation, the output surfaces 219*b* of the torque transmission regions 219 are angled contrary to a direction of rotation of the tool receiving device 213.

Respectively one output surface 219*b* of the two driving jaws 216*a*, 216*b* is parallel to a further output surface 219*b* of the further driving jaw 216*a*, 216*b*.

In a release state, the hook jaws 218*a*, 218*b* project in the axial direction of the output axis A with respect to the driving jaws 216*a*, 216*b*. In a release state, the hook jaws 218*a*, 218*b* delimit an axial extent of the tool receiving device. In a fastening state, the driving jaws 216*a*, 216*b* project in the axial direction of the output axis A with respect to the hook jaws 218*a*, 218*b*. In a fastening state, the driving jaws 216*a*, 216*b* delimit an axial extent of the tool receiving device.

The driving jaws 216*a*, 216*b* each have two radial protuberances, realized as a torque transmission region 219.

When the tool device 11 is fastened to the power tool 211, the torque transmission regions 219 of the tool receiving device 213 are located between a first orthogonal plane 235 and a second orthogonal plane 237.

The first orthogonal plane 235 delimits the tool receiving device 213, on the side facing toward the power tool 211, in the direction of the output axis A; the second orthogonal plane 237 delimits the tool receiving device 213 on the side facing away from the power tool 211.

The torque take-up regions 219 extend, in the radial direction of the output axis A, at least in sections, between a first and a second radial distance in relation to the tool rotation axis a, and at least one of these sections is configured for torque transmission 219 from the power tool 211 to the tool device 11.

Preferably, a torque transmission region 219, preferably a plurality of torque transmission regions 219, particularly preferably all torque transmission regions 219 of the power tool 211 contacts/contact the torque take-up regions 40 of the tool device 11, at least in sections, in the form of a point contact, preferably in the form of a linear contact, and particularly preferably in the form of a surface contact.

The tool receiving device 213 has two driving jaws 216*a*, 216*b*, each having two torque transmission regions 219, which are arranged so as to be mutually rotationally symmetrical about the output axis A. The torque transmission regions 219 are arranged so as to be mutually symmetrically in the circumferential direction about the output axis A, at an angle of 90°, such that the tool device can be connected to the tool receiving device 213 in four rotational positions.

When the power tool 211 is in operation, the output surfaces 219*b* and the output edges 219*b* are angled contrary to a direction of rotation of the tool receiving device.

The output surfaces 219*b* and the output edges 219*a* are angled, with respect to a plane spanned by an axial direction and a radial direction of the output axis A, at an angle β of up to 30°, in particular up to 25°, in the circumferential direction, about the output axis A.

Adjoining the driving surfaces 219*b* in the circumferential direction are outer circumferential surfaces 239. The outer circumferential surfaces 239 are designed to centre the tool device 11, in a fastening state, at the second delimiting edges 25. In particular, the outer circumferential surfaces 239 are angled, with respect to a plane spanned by an axial direction and a radial direction of the output axis a, at an angle of, for instance 1°, in the circumferential direction, about a radial axis of the output axis A, as a result of which, when the tool device 11 is being placed axially onto the tool receiving device 213, a tolerance in the radial direction becomes closer and the tool device 11 can be placed with greater precision.

The driving jaws 216*a*, 216*b* each have an inner circumferential surface 240, which lies in at least the first orthogonal plane 235 on an inner circumferential circle 243 around the output axis A. The driving jaws 216*a*, 216*b* each have two outer circumferential surfaces 239, which lie in at least the first orthogonal plane 235 on an outer circumferential circle 245*c*, which in particular delimits the circumferential surface 245, around the output axis A. The inner circumferential circle 243 is concentric with the outer circumferential circle 245*c*. The inner circumferential circle 243 has a diameter, around the output axis A, of 22 mm, such that a minimal diameter of the cutout 17 of the connection device 113, in particular the first delimiting edge 21 of the clamping wing 19, which is approximately 22.2 mm, provides for backward compatibility with conventional power tools 211.

The driving jaws 216*a*, 216*b* have a width b of 10 mm.

Adjoining at least one outer circumferential surface 239 of the driving jaws 216*a*, 216*b* there is a respective coding surface 241, which connects the inner circumferential surface 240 and the outer circumferential surface 239.

At least the inner circumferential surfaces 240, the outer circumferential surfaces 239, the coding surfaces 241 and the driving surfaces 219*b* delimit the driving jaws 216*a*, 216*b* in the radial direction of the output axis A, at least in sections.

The driving device 215 is realized by two driving jaws 216*a*, 216*b*, in particular serving as guide jaws, which are designed to guide the hook jaws 218*a*, 218*b* in the radial direction, in that movement of the hook jaws 218*a*, 218*b* in the radial direction of the output axis A about the clamping-device rotation axis k is rendered possible and, perpendicularly to this radial direction, a radial movement is delimited. The driving jaws 216*a*, 216*b* delimit the opening 225 in the radial direction of the tool rotation axis a, along a main extent of the substantially rectangular opening 225.

FIG. 4 shows, inter alia, the tool receiving device 213 with a flat, annular seating surface 261 that is designed to support the tool device 11, in particular at least the contact surface 61 of the tool device 11, in the axial direction. The seating surface 261 is arranged at a distance apart from the hook jaws 218*a*, 218*b* in the radial direction, and surrounds the hook jaws 218*a*, 218*b* in at least one plane, around 360°. Seating surface 261 extends orthogonally in relation to the output axis A.

FIG. 2 shows a portion of the work region 15 of the tool device 11, which is arranged on the connection device 113 in such a manner that, in a fastening state, the work region 15 projects with respect to the connection device 113, along the tool rotation axis, in a direction oriented toward the tool receiving device 213 of the power tool 211. In this case, when the tool device 11 is in a fastening state, the contact surface 61 of the work region 15 can be in contact with the seating surface 261 of the power tool 211, and form a non-positive connection, in the circumferential direction of the tool rotation axis a, to the power tool 11.

When the tool device 11 is in a fastening state, the contact surface 61, with the seating surface 261 of the power tool 211, forms a non-positive seating with respect to the tool device 11 in the circumferential direction. As a result, in the case of an elastic work region 61, a damping effect can also additionally be achieved in the axial direction. It is thereby also possible for the clamping wings 19 to be preloaded in the axial direction.

The seating surface 261 extends, in the radial direction of the output axis A, between a first radial inner distance Ri and a second radial outer distance Ra from the output axis A, the first radial inner distance Ri being less than the second radial outer distance Ra. The first radial inner distance Ri forms an inner radius of the seating surface 261 that delimits the seating surface 261. The second radial outer distance Ra forms an outer radius of the seating surface 261 that delimits the seating surface 261.

In a fastening state, the first delimiting edge 21 of the clamping wing 19 of the tool device 11 is oriented in the radial direction, with respect to the first radial inner distance Ri of the seating surface 261, toward the output axis A, in particular projects by up to 2 mm. The clamping wing 19 in this case projects from the seating surface 261 in such a manner that, in this region, in particular at least in the region of the first delimiting edge 21, there is no seating surface 261, or no support material, present for axially supporting the clamping wing 19.

The clamping wing 19 does not lie on the seating surface 261 in the radial direction, in particular not with its entire surface, such that the clamping wing 19 can be bent elastically in the axial direction, at least in sections. In particular, in the axial direction, there is no seating surface 261 provided immediately beneath the first delimiting edge 22 of the clamping wing 19. In particular, in the axial direction, there is no seating surface **26*a* provided immediately beneath the second delimiting edge 24 of the clamping wing. Thus, in a fastening state, the first delimiting edge 22 and/or the second delimiting edge 24 of the tool device 11 has a maximal radial extent that is less than a minimal extent, or the first radial inner distance Ri, of the seating surface 261**.

The driving device 215 may be realized as a protection device. The driving device 215 has a maximal radial extent that is greater than a maximal radial extent of the clamping device 217 in a fastening state, with the result that the driving jaws **216*a*, 216*b*, which project in the radial direction of the output axis A when the tool receiving device 213 is driven in rotation, provides protection for the hook jaws 218*a*, 218*b*, in that, when the tool device 11 is in operation, the hook jaws 218*a*, 218*b* are protected by the driving jaws 216*a*, 216*b* in the case of inadvertent contact with a workpiece the hook device 217*a*, 217*b***.

In particular, when the tool receiving device 213 is in a release state, the hook jaws **218*a*, 218*b* may project with respect to the driving jaws 216*a*, 216*b*, in the axial direction of the output axis A, in a direction oriented away from the tool receiving device 213**.

In particular, in the circumferential direction the projection edge 22 of the connection device 113 of the tool device 11 is shorter, in particular by up to 70%, preferably by up to 50%, more preferably by up to 30%, particularly preferably by up to 20%, more preferably by up to 10%, than a, in particular minimal, extent of the circumferential surface 245 in the circumferential direction about the output axis A, such that, in an operation of placing the tool device 11, the tool receiving device 213, in a release state, can be pre-centered, or roughly centered, around the hook jaws **218*a*, 218*b***.

The tool receiving device has a first attachment region and a second attachment region. The first attachment region is realized as a first flat attachment surface. The second attachment region is realized as a second flat attachment surface. The first attachment surface delimits an axial extent of the driving device. The first attachment surface delimits an axial extent of the tool receiving device in a fastening state. The second attachment surface surrounds the first attachment region, in particular in a plane of 360°. The attachment surfaces extend, at least substantially, in the radial direction of the output axis and in the circumferential direction around the output axis. The first attachment surface is spaced apart from, and in particular is parallel to, the second attachment surface in the axial direction of the output axis. The attachment surfaces delimit the output surfaces **219*b* and the output edges 219*a***. The attachment surfaces are oriented away from the tool receiving device. In a fastening state, the tool device is supported on the second attachment surface. In a release state, the tool device may be supported on the first attachment surface. The second attachment surface may the contact surface.

The driving device 217 has a circumferential delimiting contour that delimits a radial extent of the driving device 217, in particular the driving jaws **216*a*, 216*b***.

The circumferential delimiting contour of the driving device 217 forms a coding device 251 that is embodied, in the region of the output axis A, as a raised portion of the tool receiving device 213. This coding device 251 is configured to engage in the cutout 17 of the tool device 11, as is represented in FIG. 12. The coding device 251 corresponds substantially to a negative shape of the delimiting contour of the cutout 17 of the connection device 113, and thus renders possible a positive connection between the tool device 11 and the tool receiving device 213.

Also possible, however, are shapes of the cutout 17 other that the negative shape, that, at least in sections, have a radial extent that is greater than an inner circumferential circle 243, in particular greater than the outer circumferential circle **245*c*, of the driving jaws 216*a*, 216*b***.

The coding device 251 is formed by the circumferential surfaces (inner circumferential surface 240, outer circumferential surfaces 239, coding surface 241 and output surfaces **219*b*) of the driving jaws 216*a*, 216*b***.

The coding device 251 is rotationally symmetrical in relation to the output axis A, in particular according to an n-fold rotational symmetry. It is also conceivable, however, for the coding means 251 to be of a design other than a rotationally symmetrical design, such as, for example, an asymmetrical design or the like.

Further, the tool device 11 may also be used with conventional tool receiving devices 213 of a power tool 211, in particular of an angle grinder, that are designed to receive a tool device 11, such as, for example, by means of a screw-connection device, not represented further, comprising at least a fastening screw, a washer and a nut part. The tool device 11 in this case is held on the power tool 211 by means of the fastening screw, the latter exerting its action of force upon the tool device 11 by means of the washer. The transmission of the driving forces from the power tool 211 to the tool device 11 is achieved substantially by the torque transmission region 219 and the torque take-up region 40 engaging in each other in a positive manner. The tool device 11 in this case is held on the power tool 211 such that the tool rotation axis a and the output axis A substantially coincide. The tool device 11 is driven in rotation about the output axis A.

FIGS. **5*b*, 5*c*, 5*d* and 5*e* show alternative designs of the tool receiving device 213 of the hand-held power tool 211 for receiving tool devices 11 that have a symmetrically designed connection device 113. The tool receiving devices 213 represented in FIGS. 5*b*, 5*c*, 5*d* and 5*e* are at least substantially similar in design to the tool receiving device 213 represented in the preceding figures, in particular in FIG. 5***a*. Unlike the tool receiving device 213 represented in the preceding figures, the tool receiving devices 213 represented in FIGS. 5*b* 5*c*, 5*d* and 5*e* have a driving device 215 realized symmetrically in relation to a plane of symmetry that runs at least substantially parallel to the output axis A. Preferably, the output axis A runs in the plane of symmetry in relation to which the driving device 215 is symmetrical.

Figure 5A:
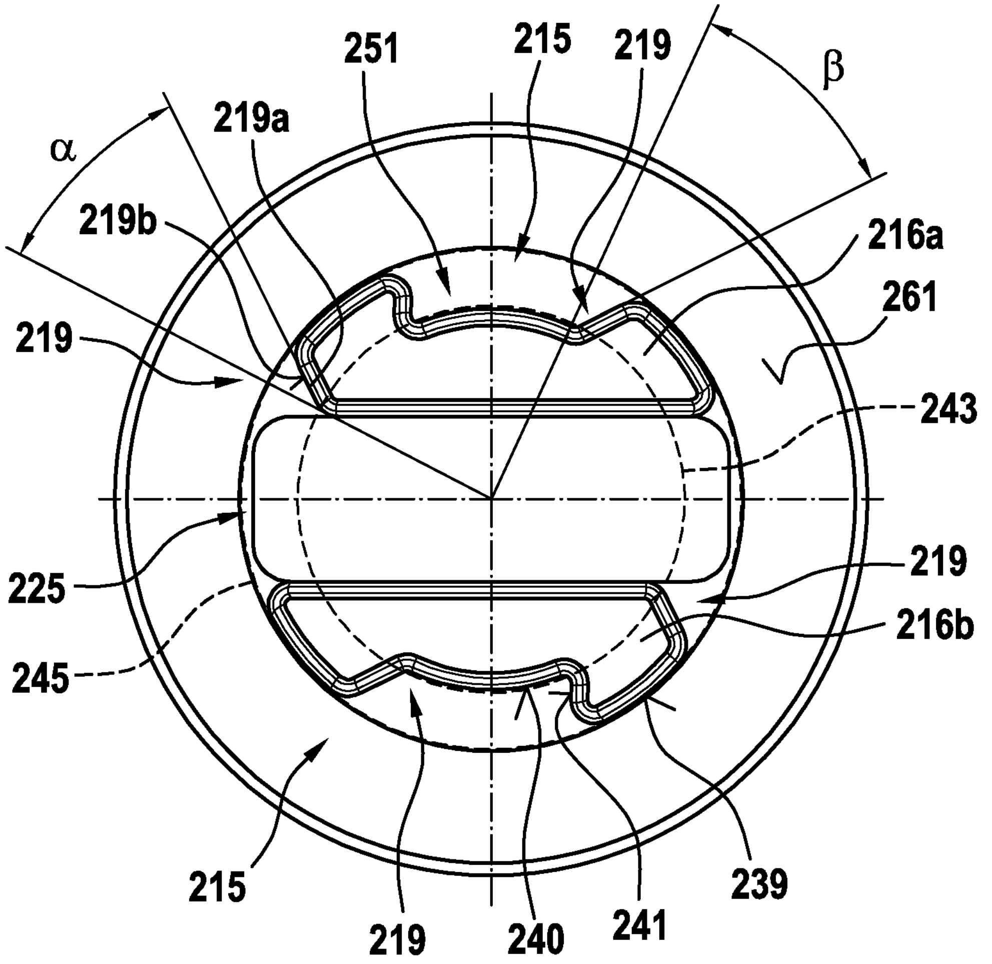
Figure 5B:
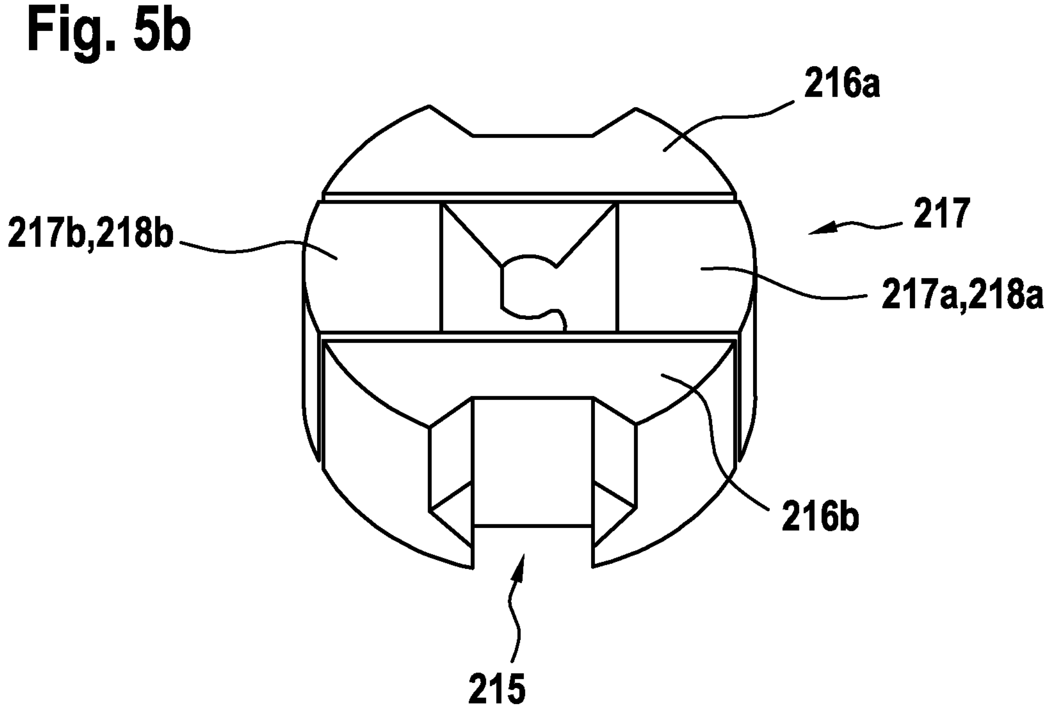

The driving device 215 represented in FIG. 5*b* has driving jaws 216*a*, 216*b* preferably realized such that they are symmetrical in relation to each other. In particular, the driving jaws 216*a*, 216*b* are realized such that they are mirror-symmetrical in relation to each other, in particular with respect to a plane of symmetry that comprises the output axis A. Preferably, the driving jaws 216*a*, 216*b* are each realized such that they are mirror-symmetrical in relation to a plane extending at least substantially perpendicularly in relation to the plane of symmetry. Preferably arranged on each of the driving jaws 216*a*, 216*b* is at least one insertion cutout of the driving device 215, into which a clamping wing 19, in particular having a rectangular, preferably trapezoidal cross section, of tool device 11, not represented in greater detail in FIG. 5*b* and realized in a manner corresponding to the tool receiving device 213 from FIG. 5*b*, can be inserted and/or arranged. In particular, the driving jaws 216*a*, 216*b* each have at least one oblique insertion surface. The oblique insertion surface is arranged, on the respective driving jaw 216*a*, 216*b*, on an outer surface of the respective driving jaw 216*a*, 216*b* that at least partly delimits the insertion cutout.

Figure 5C:
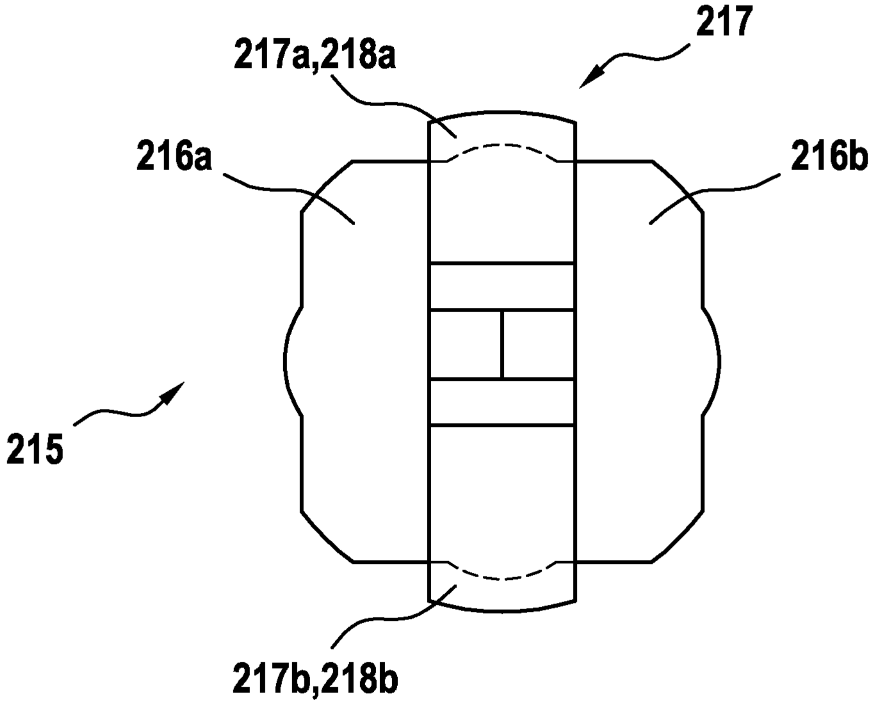

The driving device 215 represented in FIG. 5*c* has driving jaws 216*a*, 216*b* preferably realized such that they are symmetrical in relation to each other. In particular, the driving jaws 216*a*, 216*b* are realized such that they are mirror-symmetrical in relation to each other, in particular with respect to a plane of symmetry that comprises the output axis A. Preferably, the driving jaws 216*a*, 216*b* are each realized such that they are mirror-symmetrical in relation to a plane extending at least substantially perpendicularly in relation to the plane of symmetry. The driving jaws 216*a*, 216*b* each have a basic rectangular shape, having at least two slanted edges. At an outer side of the respective driving jaw 216*a*, 216*b* that connects the two slanted edges to each other, the driving jaws 216*a*, 216*b* each comprise an extension. The extension of the respective driving jaw 216*a*, 216*b* is preferably realized in the form of a circle segment. The extension of the respective driving jaw 216*a*, 216*b* may form, for example, a mounting coding element of the tool receiving device 213 represented in FIG. 5*c*. Preferably, an inner surface of the clamping device 217, which runs at least substantially perpendicularly in relation to a clamping surface 233 of a clamping device 217 of the tool receiving device 213 represented in FIG. 10*c*, has an extension in the form of a circle segment. The extension of the clamping device 217 may form, for example, a fastening coding element of the tool receiving device 213 represented in FIG. 5*c*. Preferably, advantageously by means of the clamping device 217 of the tool receiving device 213 represented in FIG. 5*c*, it is to a very large extent possible to avoid fastening of a tool device (not represented in greater detail in FIG. 5*c*), that has a cutout not corresponding to the extension of the clamping device 217. Preferably, extensions of the driving jaws 216*a*, 216*b* and extensions of the clamping device 217 form a four-fold circumferential contour of the tool receiving device 213 in a plane running at least substantially perpendicularly in relation to the output axis A.

Figure 5D:
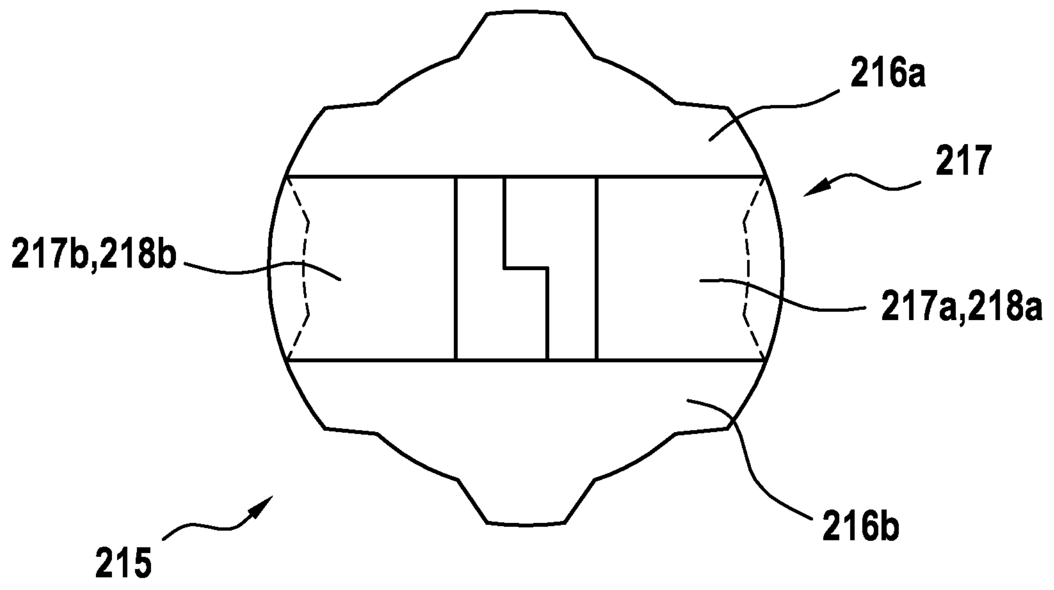

The driving device 215 represented in FIG. 5*d* has driving jaws 216*a*, 216*b* preferably realized such that they are symmetrical in relation to each other. In particular, the driving jaws 216*a*, 216*b* are realized such that they are mirror-symmetrical in relation to each other, in particular with respect to a plane of symmetry that comprises the output axis A. Preferably, the driving jaws 216*a*, 216*b* are each realized such that they are mirror-symmetrical in relation to a plane extending at least substantially perpendicularly in relation to the plane of symmetry. Preferably, each driving jaw 216*a*, 216*b* has at least two driving and/or coding contours, realized in a manner corresponding to clamping wings 19 of a tool device 11 that is not represented in greater detail in FIG. 5*d*. Preferably, the driving and/or coding contours are realized as depressions in an outer contour of the driving device 215, in particular as viewed in a plane running at least substantially perpendicularly in relation to the output axis A. A clamping device 217 of the tool receiving device 213 represented in FIG. 5*d* comprises an inner surface of the clamping device 217 that runs at least substantially perpendicularly in relation to a clamping surface 233 of the clamping device 217. The inner surface, as viewed in the plane running at least substantially perpendicularly in relation to the output axis A, has a course similar to one of the driving and/or coding contours. Preferably, the driving and/or coding contours of the driving jaws 216*a*, 216*b* and inner surfaces of the clamping device 217, in the plane running at least substantially perpendicularly in relation to the output axis A, form a six-fold circumferential contour of the tool receiving device 213.

Figure 5E:
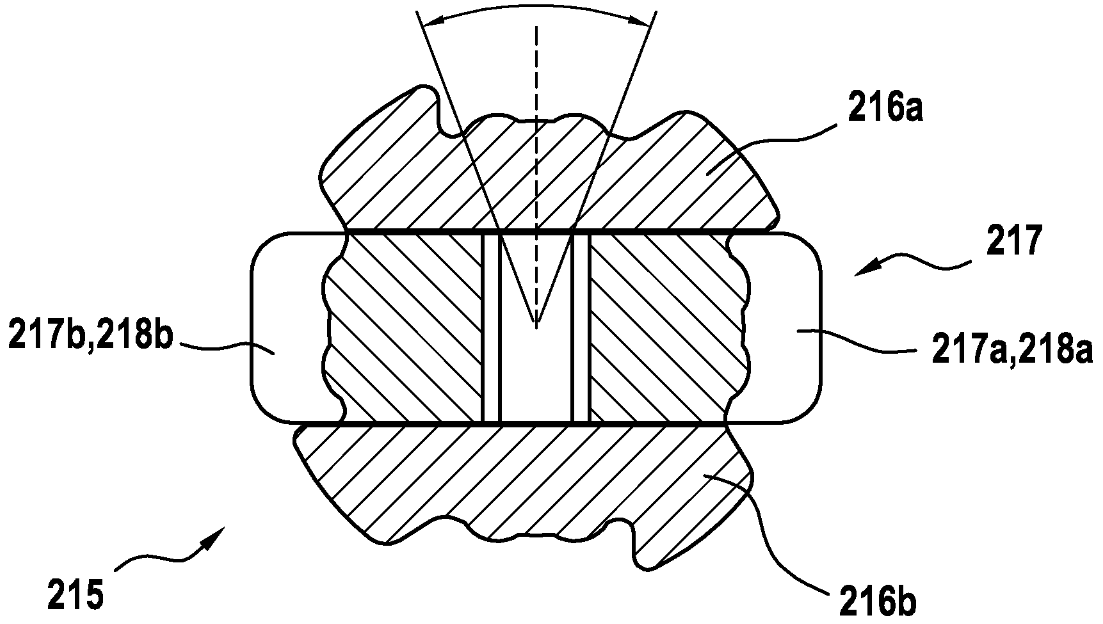
Figure 6:
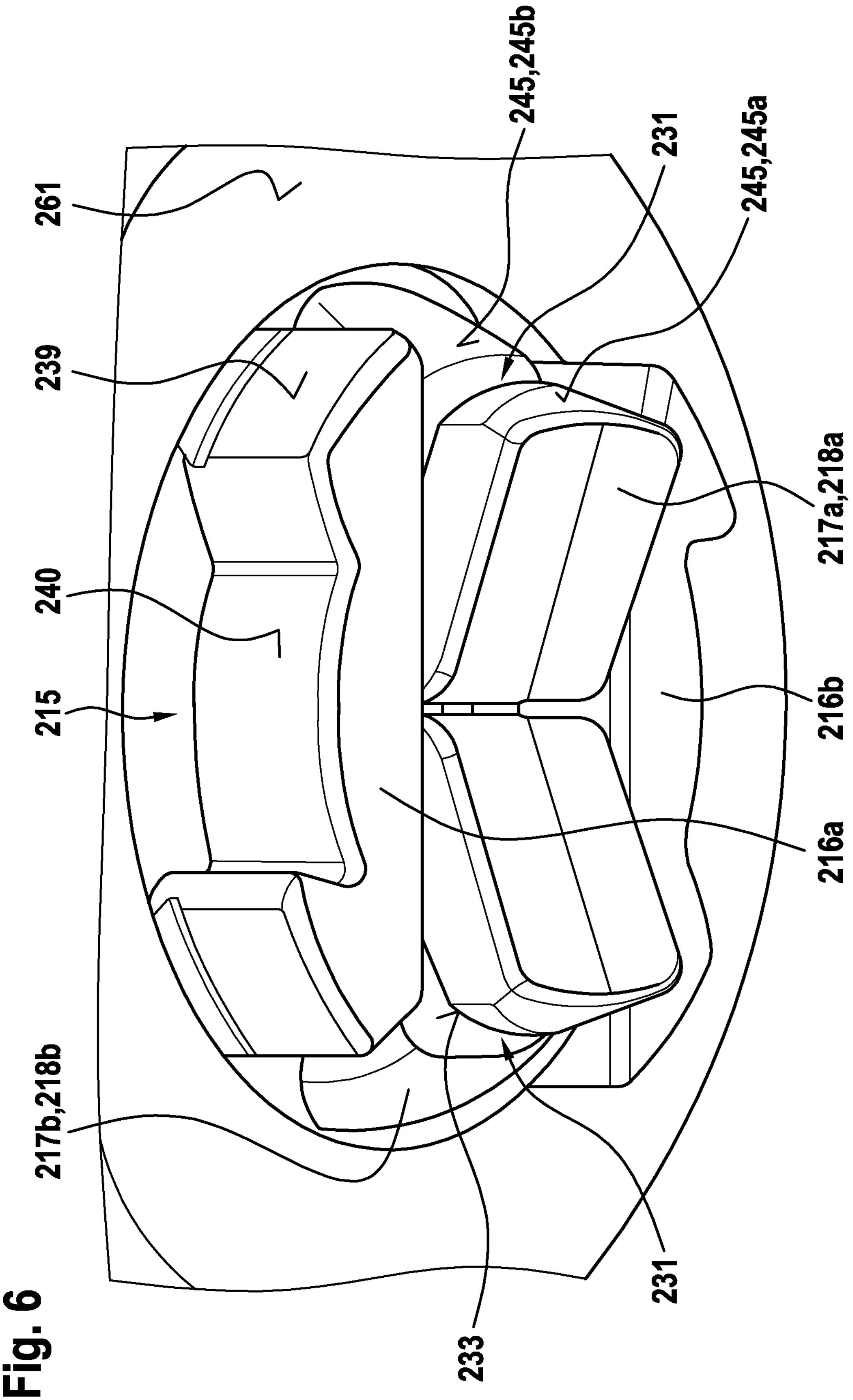
Figure 7:
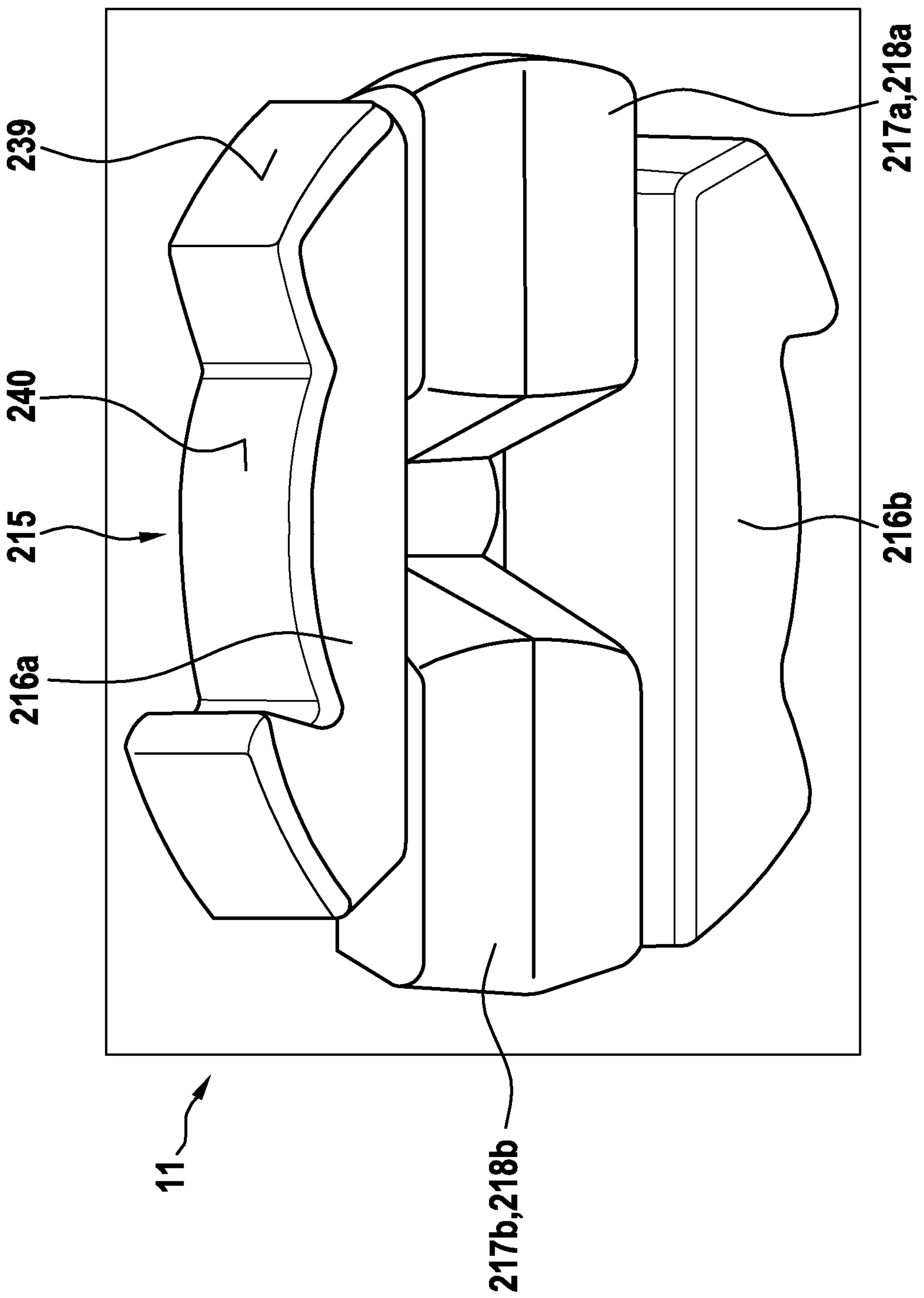
Figure 8:
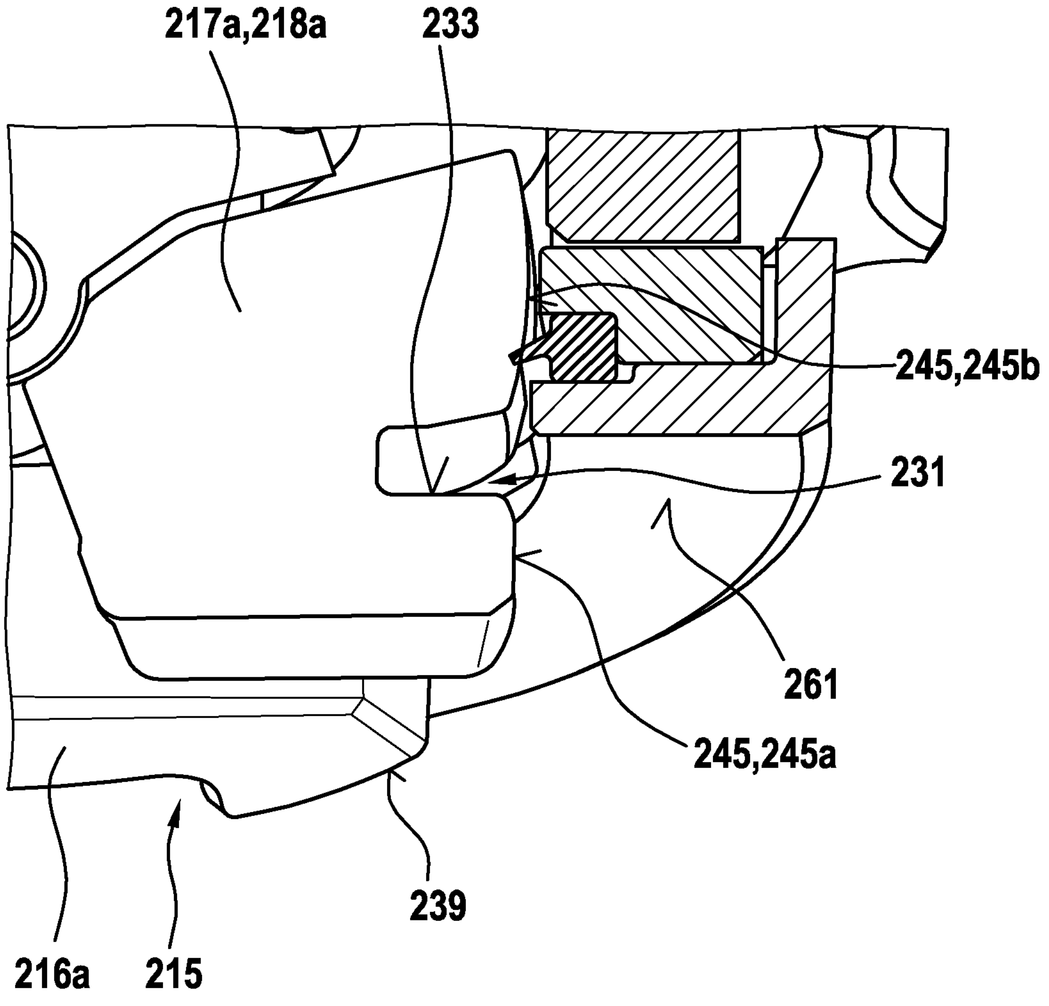
Figure 9:
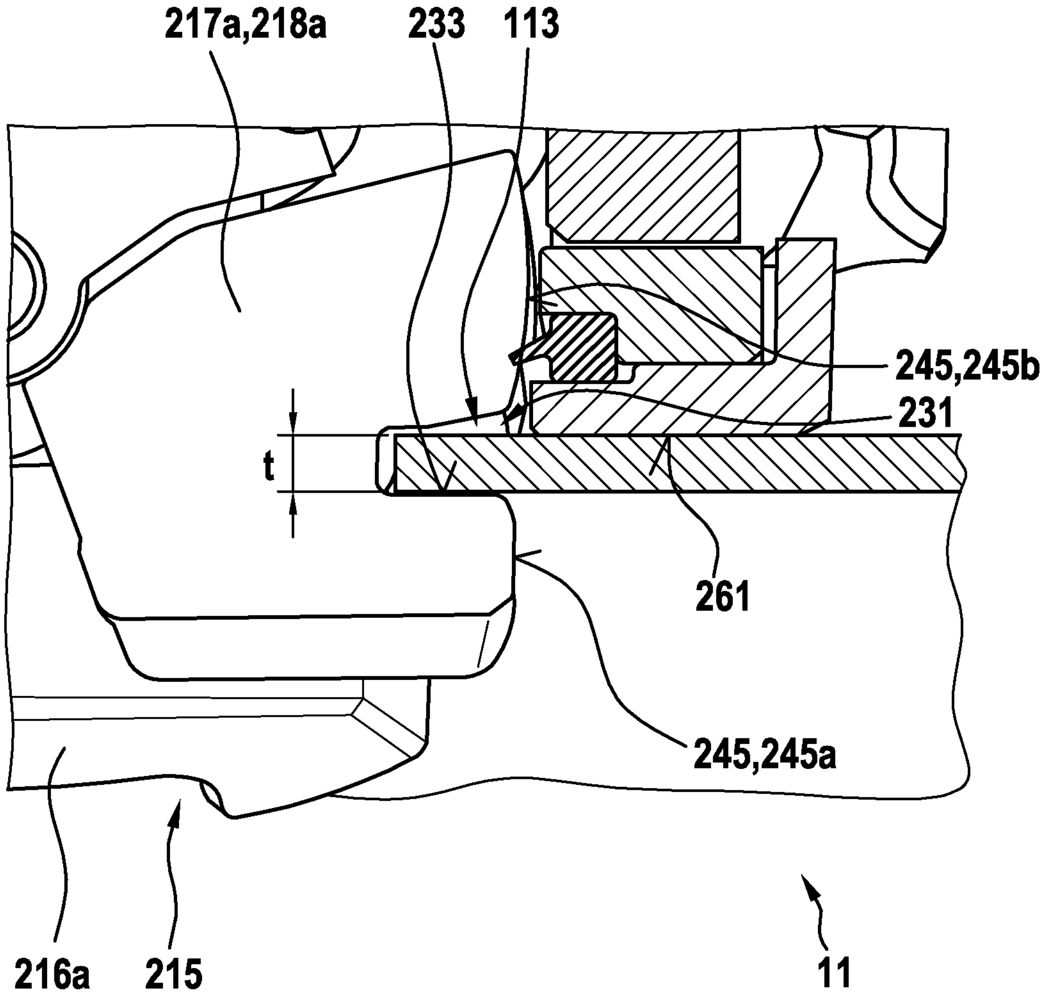
Figure 10:
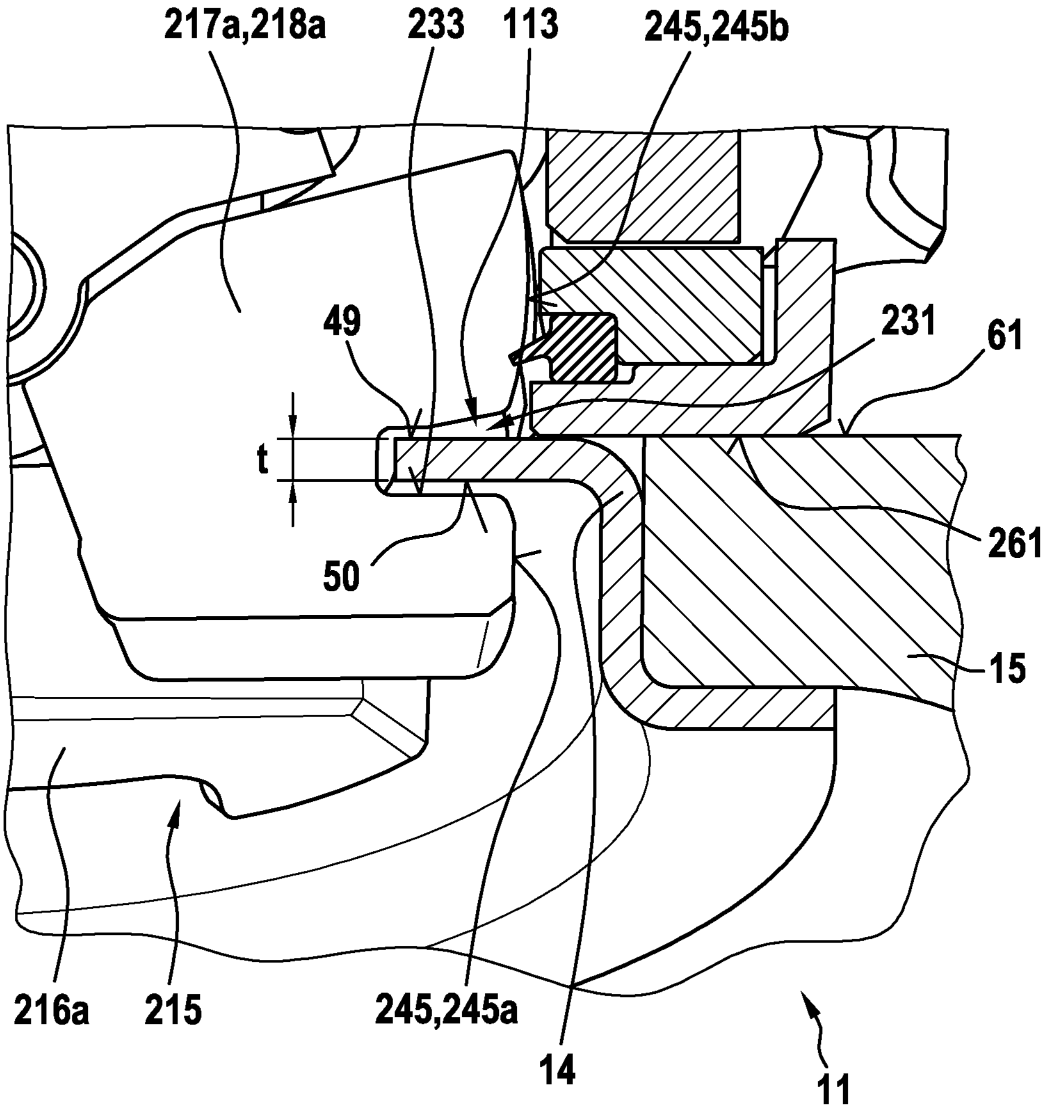

The driving device 215 represented in FIG. 5*e* has driving jaws 216*a*, 216*b* preferably realized such that they are symmetrical in relation to each other, in particular driving jaws 216*a*, 216*b* realized such that they are point-symmetrical in relation to each other. Preferably, at least two mounting coding elements 300, 302, 308, 310 of the tool receiving device 213, per driving jaw 216*a*, 216*b*, are arranged on the driving device 215. It is conceivable that, additionally or alternatively, in each case two mounting coding elements 300, 302, 308, 310 of the tool receiving device 213 are arranged at least substantially abut on the hook device 217*a*, 217*b*. The at least two mounting coding elements 300, 302, 308, 310 of the tool receiving device 213 that are arranged on the respective driving jaw 216*a*, 216*b* preferably each have a maximal circumferential extent that is less than or equal to 17 mm. Preferably, the at least two mounting coding elements 300, 302, 308, 310 of the tool receiving device 213 that are arranged on the respective driving jaw 216*a*, 216*b* are arranged, in particular together, on the respective driving jaw 216*a*, 216*b* within an angular range having a value from a value range of from 10° to 40°.

FIGS. 13 to 18 show views of additional details of the power-tool system that, for reasons of clarity, were not represented in the preceding FIGS. 1 to 12, in order to make FIGS. 1 to 12 easily comprehensible. The features disclosed in relation to FIGS. 13 to 18 can be transferred analogously to FIGS. 1 to 12.

The tool device 11 comprises at least one tool mounting coding element 304, 306, 312, 314, which is designed, when the tool device 11 has been arranged on the tool receiving device 213, to act in combination with at least one mounting coding element 300, 302, 308, 310 of the tool receiving device 213. The at least one tool mounting coding element 304, 306, 312, 314 of the tool device 11 and the at least one mounting coding element 300, 302, 308, 310 of the tool receiving device 213 are realized, in particular, such that they correspond. Preferably, the at least one mounting coding element 300, 302, 308, 310 of the tool receiving device 213 is designed to code an arranging, fixing or placing of the tool device 11 at or on the tool receiving device 213, in particular the seating surface 261. Preferably, the at least one mounting coding element 300, 302, 308, 310 of the tool receiving device 213 is designed to code an arranging, fixing or placing of the tool device 11 at or on the tool receiving device 213, in particular the seating surface 261, according to a key-and-keyhole principle.

The driving device 215 comprises at least one mounting coding element 300, 302, which is designed to act in combination with at least one tool mounting coding element 304, 306 of the tool device 11, when the tool device 11 has been arranged on the tool receiving device 213. The at least one mounting coding element 300, 302 of the driving device 215 is arranged on at least one driving jaw 216*a*, 216*b* of the driving device 215 (cf. FIG. 13).

The at least one mounting coding element 300, 302 of the driving device 215 is realized as a mechanical mounting coding element. The at least one mounting coding element 300, 302 of the driving device 215 is realized as a single piece with the driving jaw 216*a*, 216*b*. The at least one mounting coding element 300, 302 of the driving device 215 is realized as an extension. It is also conceivable, however, for the at least one mounting coding element 300, 302 of the driving device 215 to be of a different design, considered appropriate by persons skilled in the art, such as, for example, designed as a cutout, as a web, or the like. The at least one mounting coding element 300, 302 of the driving device 215 preferably extends at least along a direction running transversely, at least substantially perpendicularly, in relation to the tool rotation axis a of the tool device 11. The at least one mounting coding element 300, 302 of the driving device 215 is arranged such that it adjoins the inner circumferential surface 240 of the at least one driving jaw 216*a*, 216*b*. The at least one mounting coding element 300, 302 of the driving device 215 extends, starting from the inner circumferential surface 240 of the at least one driving jaw 216*a*, 216*b*, in particular in a direction away from the tool rotation axis a, in particular maximally up to the circumferential surface 245, which is delimited by the outer circumferential circle 245*c* (cf. FIGS. 12 and 13).

The at least one mounting coding element 300, 302 of the driving device 215, as viewed along a circumferential direction, is preferably arranged between the drive edge 219*a* and/or the driving surface 219*b* and a side of the driving jaw 216*a*, 216*b* that faces away from the drive edge 219*a* and/or the driving surface 219*b*. Preferably, along the circumferential direction, the at least one mounting coding element 300, 302 of the driving device 215 has a maximal extent that is less than a maximal distance between the drive edge 219*a* and/or the driving surface 219*b* and side of the driving jaw 216*a*, 216*b* that faces away from the drive edge 219*a* and/or the driving surface 219*b*, along the circumferential direction. Preferably, the at least one mounting coding element 300, 302 of the driving device 215 is arranged in an angular range of less than 60° between the drive edge 219*a* and/or the driving surface 219*b* and side of the driving jaw 216*a*, 216*b* that faces away from the drive edge 219*a* and/or the driving surface 219*b*.

The at least one mounting coding element 300, 302 of the driving device 215 may be of any design considered appropriate by persons skilled in the art. For example, it is conceivable for at least one mounting coding element 300, 302 of the driving device 215, in particular as viewed in the first orthogonal plane 235, to have a polygonal (square, rectangular, triangular, n-cornered, or the like) or a circular (semicircular, semicircular with a fluted outer circumferential line, or the like) cross section, as can also be deduced, by way of example, from FIG. 15, since the at least one tool mounting coding element 304, 306, 312, 314 of the tool device 11 is preferably realized to correspond to the at least one mounting coding element 300, 302, 308, 310 of the tool receiving device 213. It is also conceivable, however, for the at least one tool mounting coding element 304, 306, 312, 314 of the tool device 11 and the at least one mounting coding element 300, 302, 308, 310 of the tool receiving device 213 to be realized differently, in particular in respect of a dimension. For example, it is conceivable for the at least one tool mounting coding element 304, 306, 312, 314 of the tool device 11 to have, along a circumferential direction or along a radial direction, a maximal extent that corresponds to a multiple of a maximal extent of the at least one mounting coding element 300, 302, 308, 310 of the tool receiving device 213, or the like.

Figure 13:
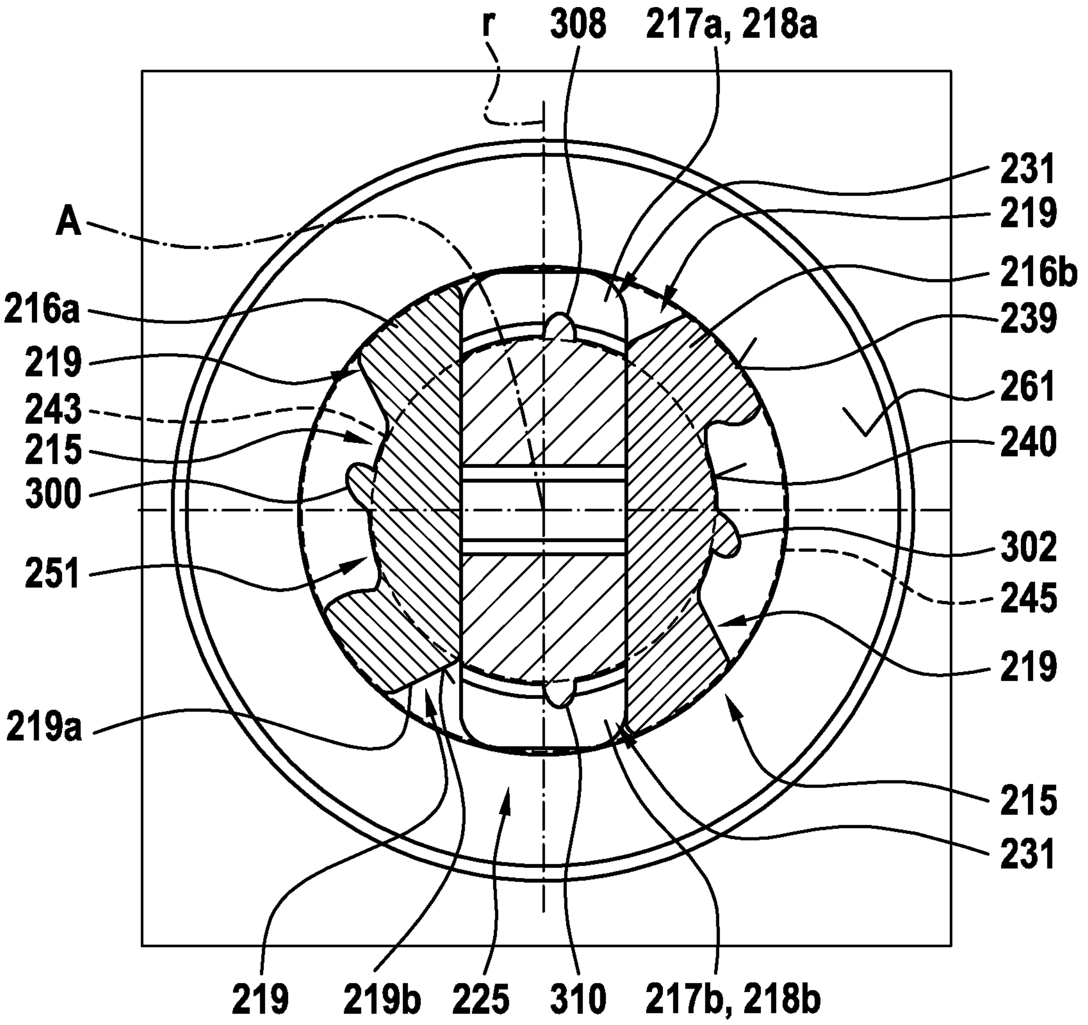

Preferably, at least one mounting coding element 300, 302 is arranged at least on each driving jaw 216*a*, 216*b* of the driving device 215 (cf. FIG. 13). It is also conceivable, however, for more than one mounting coding element 300, 302 per driving jaw 216*a*, 216*b* to be provided, such as, for example, at least two, at least three, at least four or more mounting coding elements 300, 302 per driving jaw 216*a*, 216*b*. In particular, the mounting coding elements 300, 302 arranged on the driving jaws 216*a*, 216*b* are similar to each other in design. A differing design of the mounting coding elements 300, 302 is also conceivable.

Preferably, the mounting coding elements 300, 302 of the driving device 215 that are arranged on the driving jaws 216*a*, 216*b* are arranged asymmetrically on the driving jaws 216*a*, 216*b* in relation to a plane that comprises the output axis A. It is also conceivable, however, for the mounting coding elements 300, 302 of the driving device 215 that are arranged on the driving jaws 216*a*, 216*b* to be arranged symmetrically on the driving jaws 216*a*, 216*b* in relation to a plane that comprises the output axis A, as can be deduced, in particular, by way of example of the possible corresponding arrangements of the tool mounting coding elements 304, 306, 312, 314, from FIG. 1.

Figure 17:
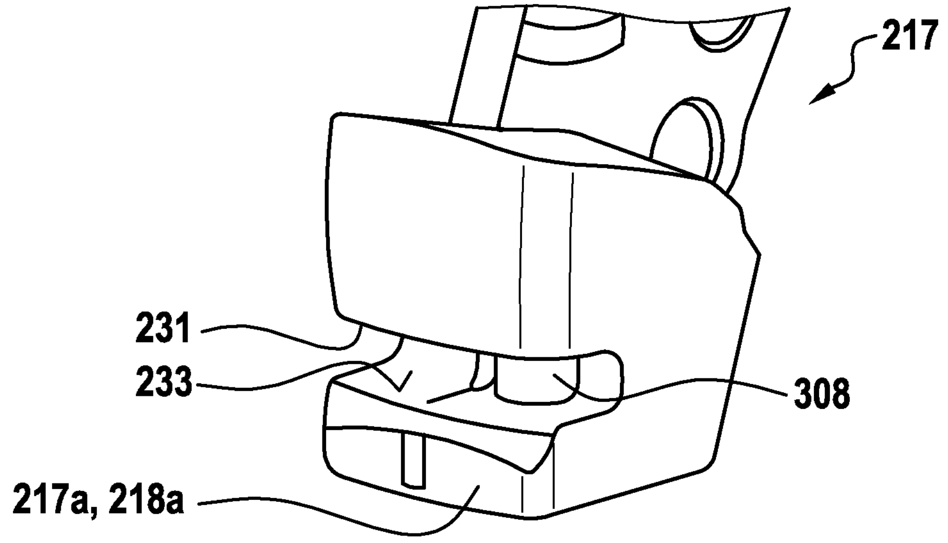

The clamping device 217, in particular at least the hook device 217*a*, 217*b* of the clamping device 217, comprises at least one mounting coding element 308, 310 (cf. FIGS. 13 and 17). The mounting coding element 308, 310 of the clamping device 217 is preferably arranged on the hook jaw 218*a*, 218*b*, in particular in the clamping cutout 231 of the hook jaws 218*a*, 218*b*. Preferably, the clamping device 217 comprises a multiplicity of mounting coding elements 308, 310, in particular at least two. It is also conceivable, however, for the clamping device 217 to have a number of mounting coding elements 308, 310, arranged on the hook device 217*a*, 217*b*, other than one and two. Preferably, the at least one mounting coding element 308, 310 of the clamping device 217 forms a fixing coding element, which is designed to code a fastening of the tool device 11 to the tool receiving device 213. Preferably, the at least one mounting coding element 308, 310 of the clamping device 217 is designed to code a fastening of the tool device 11 to the tool receiving device 213 according to a key-and-keyhole principle.

Preferably, the at least one mounting coding element 308, 310 of the clamping device 217 is realized as a single piece with the hook jaw 218*a*, 218*b*. It is also conceivable, however, for the at least one mounting coding element 308, 310 of the clamping device 217 to be realized as separate from the hook jaw 218*a*, 218*b*, and to be fixed to the hook jaw 218*a*, 218*b* by means of a connection considered appropriate by persons skilled in the art. Preferably, the at least one mounting coding element 308, 310 of the clamping device 217 is arranged on the clamping surface 233 of the clamping device 217, in particular directly adjoining the clamping surface 233, which at least partly delimits the clamping cutout 231. In particular, within the clamping cutout 231 the at least one mounting coding element 308, 310 of the clamping device 217 has a maximal extent that is less than a maximal extent of the clamping surface 233 of the clamping device 217. Preferably, the at least one mounting coding element 308, 310 of the clamping device 217 is realized is an extension. It is also conceivable, however, or the at least one mounting coding element 308, 310 of the clamping device 217 to be of a different design, considered appropriate by persons skilled in the art, such as, for example, designed as a cutout, as a groove, as a web, as a notched contour, or the like. The at least one mounting coding element 308, 310 of the clamping device 217 may be arranged on the hook jaw 218*a*, 218*b*, symmetrically or asymmetrically in relation to a central plane, in particular a plane of symmetry, of the hook jaw 218*a*, 218*b*, as can be deduced, in particular, by way of example of the possible corresponding arrangements of the tool mounting coding elements 304, 306, 312, 314, from FIG. 18.

Preferably, the central plane of the hook jaw 218*a*, 218*b*, in particular the plane of symmetry in relation to which the hook jaws 218*a*, 218*b* is realized at least substantially symmetrically, at least apart from the arrangement of the mounting coding element 308, 310, runs at least substantially parallel to the output axis A and/or comprises the latter. It is also conceivable for the at least one mounting coding element 308, 310 of the clamping device 217 to be arranged on the hook jaw 218*a*, 218*b* spaced apart relative to the central plane, in particular relative to the plane of symmetry of the hook jaw 218*a*, 218*b*.

The connection device 113 of the tool device 11 comprises the at least one tool mounting coding element 304, 306, 312, 314, which is designed, when the tool device 11 has been arranged on the tool receiving device 213, to act in combination with the at least one mounting coding element 300, 302, 308, 310 of the tool receiving device 213. The at least one tool mounting coding element 304, 306, 312, 314 is arranged on the at least one clamping wing 19 of the connection device 113 (cf. FIG. 18). The at least one tool mounting coding element 304, 306, 312, 314 has, along a radial axis r, a maximal extent that corresponds maximally to a maximal distance between the first delimiting circle 23 and the second delimiting circle 27 of the connection device 113, as can be seen, by way of example, from the differing embodiment possibilities of the connection device 113 in FIG. 18. The at least one tool mounting coding element 304, 306, 312, 314 is preferably arranged, in an angular range between the drive edge 40*a* and the coding edge 35 of the connection device 113, on the clamping wing 19 of the connection device 113. In particular, the angular range has a maximal extent of less than 90°, preferably of less than 60°, and particularly preferably of less than 40°. The at least one tool mounting coding element 304, 306, 312, 314 has, along a circumferential direction, a maximal extent that is preferably less than a maximal distance between the drive edge 40*a* and the coding edge 35 of the connection device 113. In particular, the at least one tool mounting coding element 304, 306, 312, 314 extends along a circumferential direction in a region between the drive edge 40*a* and the coding edge 35. The region between the drive edge 40*a* and the coding edge 35 is preferably arranged within the first delimiting circle 23 and the second delimiting circle 27 of the connection device 113. Preferably, the region is formed by a sub-region of a circular ring delimiting by the first delimiting circle 23 and the second delimiting circle 27 of the connection device 113, as can be seen, by way of example, from the various embodiment possibilities of the tabular listing in FIG. 18, a combination of represented embodiment possibilities also being quite conceivable. The connection device 113 preferably comprises a multiplicity of tool mounting coding elements 304, 306, 312, 314, which may be arranged symmetrically, in particular according to an n-fold rotational symmetry, or non-symmetrically on the connection device 113, in particular on the clamping wings 19.

Figure 14:
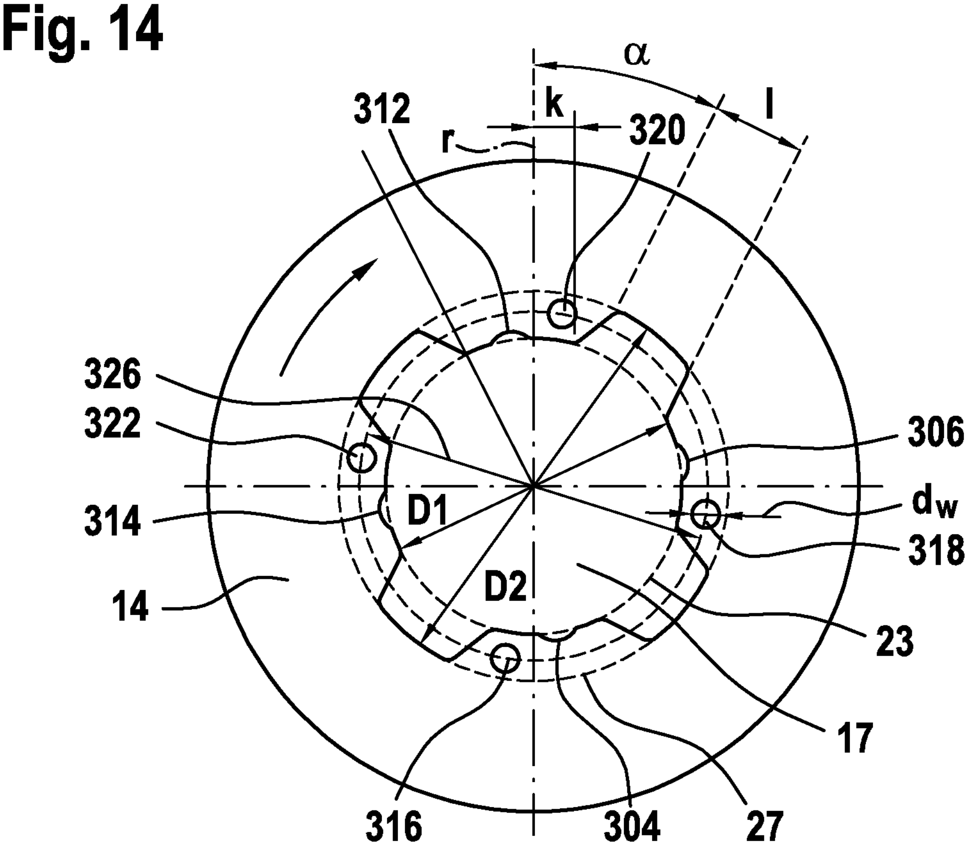

FIG. 14 shows an embodiment of the tool device 11 according to the disclosure with at least one tool mounting coding element 304, 306, 312, 314, which is designed, when the tool device 11 has been arranged on the tool receiving device 213, to act in combination with at least one mounting coding element 300, 302, 308, 310 of the tool receiving device 213. The at least one tool mounting coding element 304, 306, 312, 314 is arranged on the at least one clamping wing 19 of the connection device 113. The at least one tool mounting coding element 304, 306, 312, 314 has, along a radial axis r, a maximal extent that corresponds maximally to a maximal distance between the first delimiting circle 23 and the second delimiting circle 27 of the connection device 113, as can be seen, by way of example, from the differing embodiment possibilities of the connection device 113 in FIG. 18. The at least one tool mounting coding element 304, 306, 312, 314 is preferably arranged, in an angular range between the drive edge 40*a* and the coding edge 35 of the connection device 113, on the clamping wing 19 of the connection device 113.

As an alternative or in addition to the at least one tool mounting coding element 304, 306, 312, 314, the tool device 11 shown in FIG. 14 comprises at least one additional tool mounting coding element 316, 318, 320, 322, which is designed to receive a securing and/or positioning element 324 (represented exemplarily in FIGS. 16*a* and 16*b*) that is movably mounted on the tool receiving device 213. The movably supported securing and/or positioning element 324 of the tool receiving device 213 may be realized, for example, as a spring-loaded latching pin or the like. The at least one additional tool mounting coding element 316, 318, 320, 322 is preferably arranged on the clamping wing 19. Preferably, the at least one additional tool mounting coding element 316, 318, 320, 322 realized as a material-free opening in the clamping wing 19, in particular as a cutout extending fully through a maximal material thickness h of the clamping wing 19. It is also conceivable, however, for the additional tool mounting coding element 316, 318, 320, 322 to be realized as a depression, such as, for example, as a depression produced by a stamping process, on the clamping wing 19 and/or on the carrier flange 14, as is represented exemplarily in FIGS. 16*a* and 16*b*. The carrier flange 14 may be realized as a single piece with the work region 15, or connected to the work region 15 in a positive and/or non-positive matter by means of a fastening element of the carrier flange 14, in particular produced by a stamping process (cf. FIGS. 16*a* and 16*b*).

A maximal diameter $d_w$ of the at least one additional tool mounting coding element 316, 318, 320, 322 preferably corresponds to a value from a value range of from 0.8 mm to 1.6 mm. Preferably, the at least one additional tool mounting coding element 316, 318, 320, 322 is arranged on the clamping wing 19, in a radial region between the first delimiting circle 23 and the second delimiting circle. It is also conceivable, however, for the at least one additional tool mounting coding element 316, 318, 320, 322 to be arranged in a different region of the tool device 11. Advantageously, the tool device 11 comprises a multiplicity of additional tool mounting coding elements 316, 318, 320, 322, which are preferably arranged in an evenly distributed manner on the tool device 11, in particular on the carrier flange 14 of the tool device 11. In particular, the additional tool mounting coding elements 316, 318, 320, 322 are arranged on a common circular ring 326, which has a maximal diameter having a value from a value range of from 23 mm to 28 mm. The common circular ring preferably has a central point arranged on the tool rotation axis a.

Figure 15:
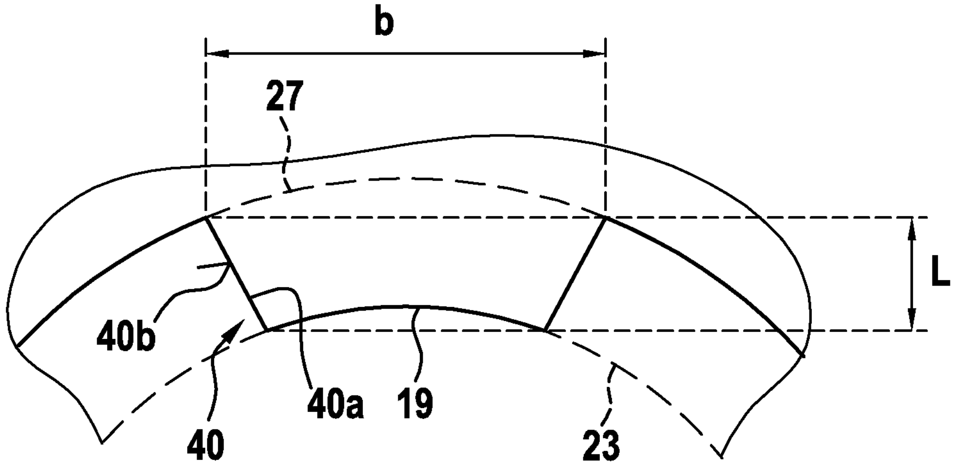
Figure 16A:
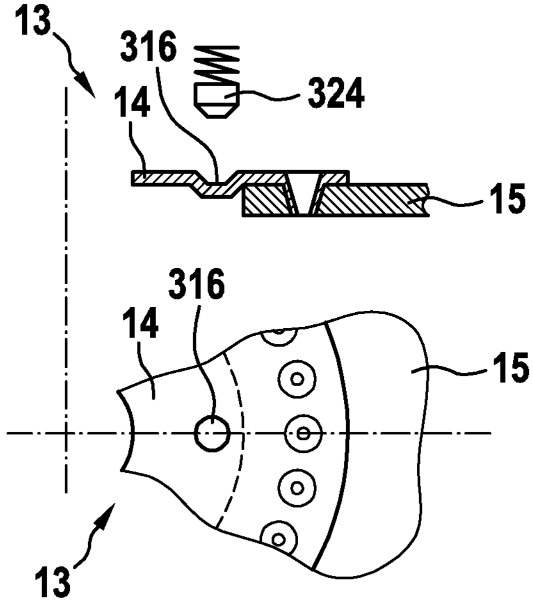
Figure 16B:
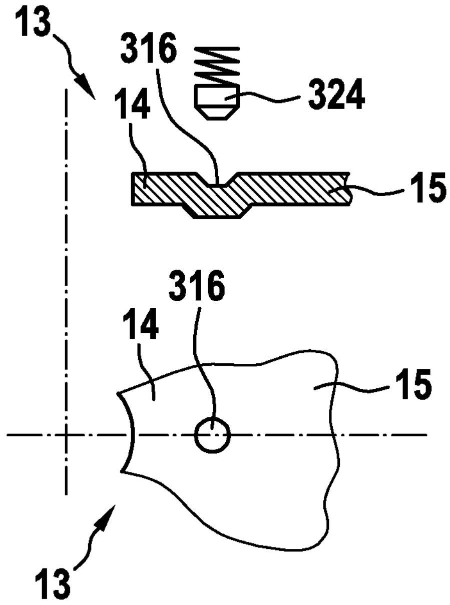

FIG. 15 shows a detail view of one of the clamping wings 19. Preferably, the clamping wing 19 has a spring constant D, corresponding to a rate of spring, having a value from a value range of from 10000 N/mm to 350000 N/mm. The maximal spring constant D of the clamping wing corresponding to a rate of spring is preferably given by the following relationship:

F=Dz, wherein $$\frac{3EI}{L^8}, Z = \frac{FL^8}{3EI}, I = \frac{bh^8}{12}$$

with L as a, in particular averaged, maximal extent of the clamping wing 19 between the first delimiting circle 23 and the second delimiting circle 27, in particular along a direction running at least substantially parallel to the radial axis r, with b as a maximal tangential extent of the clamping wing 19, tangentially to the second delimiting circle 27, and with h as a maximal material thickness of the clamping wing 19 along the axial direction of the tool rotation axis a. The maximal material thickness h may preferably correspond to a value from a value range of from 0.5 mm to 1.6 mm.

Figure 18:
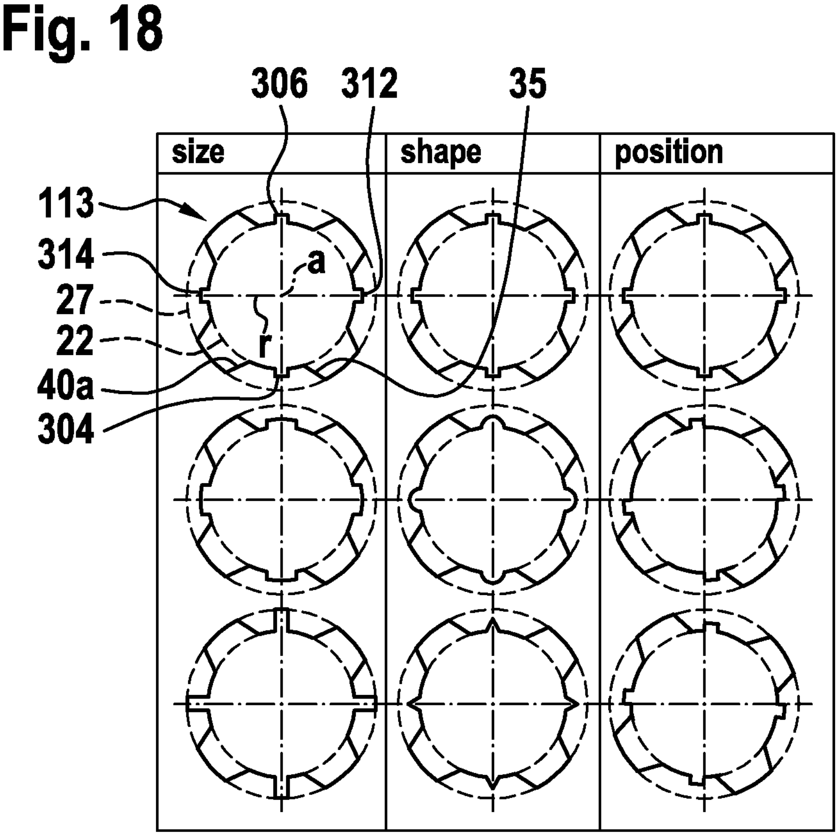

The tabular listing, represented in FIG. 18, of exemplary possible embodiments of the connection device 113, in particular in respect of possible embodiments of the tool mounting coding elements 304, 306, 312, 314, shows, in a first column of the tabular listing, possible embodiments of the tool mounting coding elements 304, 306, 312, 314 in respect of a size, in particular a length, a width, or the like. A second column of the tabular listing shows possible embodiments of the tool mounting coding elements 304, 306, 312, 314 in respect of a shape, such as, for example, a polygonal shape, a circular shape, or the like. A third column of the tabular listing shows possible embodiments of the tool mounting coding element 304, 306, 312, 314 in respect of an arrangement relative to the radial axis r or to a plane that comprises the tool rotation axis a, such as, for example, a symmetrical arrangement in relation to the radial axis r, a unilateral arrangement in relation to the radial axis r, an n-fold rotational symmetry, or the like. In FIG. 18, the references are assigned only to one embodiment possibility, to improve the clarity of the tabular listing. However, the possible embodiments of the connection device 113 represented in FIG. 18, in particular in respect of possible embodiments of the tool mounting coding elements 304, 306, 312, 314, are not intended here to be regarded as limiting, since the tool mounting coding elements 304, 306, 312, 314 may have further possible embodiments considered appropriate by persons skilled in the art.

The invention claimed is:

1. A power tool, comprising:

a tool receiving device configured to be moved in rotation about an output axis and hold a tool device on the power tool such that the output axis and a tool rotation axis substantially coincide, the tool receiving device comprising:

at least one driving device having a plurality of torque transmission regions arranged at a distance from the output axis and configured to transmit a driving force to the tool device; and a clamping device that is movable relative to the driving device between a first position, in which the tool device is released from the clamping device, and a second position, in which the clamping device clamps the tool device to the power tool, wherein:

the driving device and the clamping device are configured to jointly extend through a cutout of the tool device through which the output axis extends and are adjacent to one another in the cutout, the cutout extending through the entire material thickness of the tool device, and the at least one driving device comprises at least one driving block that includes at least two torque transmission lugs that project radially from a central portion of the at least one drive block, each of the at least two torque transmission lugs including at least one torque transmission region of the plurality of torque transmission regions, the at least one driving block being integrally formed with both of the at least two torque transmission lugs.

2. The power tool of claim 1, wherein the clamping device includes hook jaws, which are configured to rotate between the first and second positions.

3. The power tool of claim 2, wherein the hook jaws are configured, in the second position, to clamp the tool device to the power tool.

4. The power tool of claim 3, wherein each of the hook jaws includes a clamping cutout defined extending radially into the hook jaws.

5. The power tool of claim 4, wherein each of the hook jaws includes a clamping surface that partially defines the clamping cutout, the hook jaws configured such that, in the second position, the clamping surface clamps the tool device to the power tool.

6. The power tool of claim 2, wherein the hook jaws are configured to rotate about an axis that is substantially orthogonal to the output axis.

7. The power tool of claim 1, wherein the tool receiving device further comprises a seating surface against which the tool device is clamped in the second position of the clamping device.

8. The power tool of claim 7, wherein the seating surface delimits at least part of an axial opening in which the clamping device is arranged, and the seating surface radially surrounds the clamping device and the driving device.

9. The power tool of claim 8, wherein the tool receiving device defines the axial opening in which the clamping device is arranged.

10. The power tool of claim 9, wherein the at least one driving blocks includes at least two driving blocks that delimit part of the axial opening in a radial direction of the output axis, the at least two driving blocks configured to guide the clamping device of the tool receiving device in the radial direction, wherein the at least two driving blocks that are arranged parallel to and spaced apart from each other, the at least two driving blocks being symmetrical relative to one another around the output axis.

11. The power tool of claim 1, wherein the driving device has a maximal radial extent relative to the output axis that is greater than a maximal radial extent of the clamping device in a fastening state.

12. The power tool of claim 1, wherein, when the clamping device is in the first position, the clamping device projects, relative to the driving device, away from the power tool in an axial direction.

13. The power tool of claim 1, wherein the at least one torque transmission lug of the driving device has an output edge or surface that forms the at least one torque transmission region, and wherein one or more of:

(i) the output edge or surface is rectilinear, flat, or curved, (ii) the output edge or surface is angled contrary to a direction of rotation of the tool receiving device when the power tool is in operation, (iii) the at least one torque transmission region includes at least two torque transmission regions, each having a respective output edge or surface, which are oriented away from each other, and which are substantially parallel to each other, and (iv) the output edge or surface is angled with respect to a plane spanned by an axial direction and a radial direction of the output axis, in a circumferential direction around the output axis.

14. A power tool system, comprising:

the power tool as claimed in claim 1; and the tool device configured to be received in the tool receiving device, wherein the tool receiving device holds the tool device on the power tool such that the output axis of the power tool and the tool rotation axis substantially coincide, wherein the cutout is formed as a single cutout through which both the driving device and the clamping device extend.

15. The power tool system of claim 14, wherein:

the clamping device has at least one clamping surface configured to transmit an axial action of force to the tool device, and the tool device has a connection device defining the cutout, which is configured to at least partly encompass the tool receiving device of the power tool in a circumferential direction.

16. The power tool system of claim 15, wherein:

the tool device has at least one torque take-up region that is spaced apart radially from the tool rotation axis, the at least one torque take-up region at least partially delimiting the cutout in a radial direction, and the driving device and the clamping device are configured to reach through the cutout of the tool device, and to clamp the tool device to the tool receiving device by rotation of the clamping device.

17. A power tool system comprising:

a tool device defining a cutout extending through the entire material thickness of the tool device; and a power tool comprising:

a tool receiving device configured to be moved in rotation about an output axis and hold the tool device on the power tool such that the output axis and a tool rotation axis substantially coincide, the tool receiving device comprising:

at least one driving device having at least one torque transmission region arranged at a distance from the output axis and configured to transmit a driving force to the tool device; and a clamping device that is movable relative to the driving device between a first position, in which the tool device is released from the clamping device, and a second position, in which the clamping device clamps the tool device to the power tool, wherein:

the driving device and the clamping device are configured to extend through the cutout of the tool device, the output axis extends through the cutout, the tool device is configured to be received in the tool receiving device, the tool receiving device holding the tool device on the power tool such that the output axis of the power tool and the tool rotation axis substantially coincide, the clamping device has at least one clamping surface configured to transmit an axial action of force to the tool device, the tool device has a connection device defining the cutout, which is configured to at least partly encompass the tool receiving device of the power tool in a circumferential direction, the tool device has at least one torque take-up region that is spaced apart radially from the tool rotation axis, the torque take-up region at least partially delimiting the cutout in a radial direction, the driving device and the clamping device are configured to reach through the cutout of the tool device, and to clamp the tool device to the tool receiving device by rotation of the clamping device, the tool receiving device has a flat seating surface that is configured to support at least one contact surface of the tool device in the axial direction such that the seating surface extends, in the radial direction of the tool rotation axis, between a radial inner distance and a radial outer distance from the output axis, the connection device of the tool device has at least one clamping wing, which at least partly delimits the cutout in the radial direction and which is delimited substantially in the radial direction in relation to the tool rotation axis by a first delimiting edge that lies on a first delimiting circle around the tool rotation axis, and when the tool device is fastened to the power tool, the first delimiting edge of the clamping wing of the tool device projects radially inwardly from the radial inner distance of the seating surface such that in a region of the first delimiting edge there is no support material present for supporting the clamping wing.

18. A power tool, comprising:

a tool receiving device configured to be moved in rotation about an output axis and hold a tool device on the power tool such that the output axis and a tool rotation axis substantially coincide, the tool receiving device comprising:

at least one driving device having a plurality of torque transmission regions arranged at a distance from the output axis and configured to transmit a driving force to the tool device; and a clamping device that is movable relative to the driving device between a first position, in which the tool device is released from the clamping device, and a second position, in which the clamping device clamps the tool device to the power tool, wherein:

the at least one driving device and the clamping device are configured to jointly extend through a cutout of the tool device through which the output axis extends and are adjacent to one another in the cutout, the cutout extending through the entire material thickness of the tool device, and the driving device delimits an opening, and the clamping device is movable within the opening and is guided by the driving device within the opening.

19. The power tool of claim 18, wherein:

the at least one driving device includes two driving blocks, the two driving blocks defining the opening and guiding the clamping device within the opening.

20. The power tool of claim 19, wherein:

each of the two driving blocks includes a central portion that defines the opening and is configured to guide the clamping device within the opening, and each of the two driving blocks includes at least one torque transmission lug extending radially from the central portion and defining at least one torque transmission region of the plurality of torque transmission regions.

* * * * *